(12) United States Patent
Sonoda et al.

(10) Patent No.: US 12,129,325 B2
(45) Date of Patent: Oct. 29, 2024

(54) HYDROGENATED BLOCK COPOLYMER

(71) Applicant: Asahi Kasei Kabushiki Kaisha, Tokyo (JP)

(72) Inventors: Yuya Sonoda, Tokyo (JP); Takahiro Tsuji, Tokyo (JP); Katsunori Nitta, Tokyo (JP); Tatsuya Hisatomi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 475 days.

(21) Appl. No.: 17/439,866

(22) PCT Filed: Mar. 13, 2020

(86) PCT No.: PCT/JP2020/011123
§ 371 (c)(1),
(2) Date: Sep. 16, 2021

(87) PCT Pub. No.: WO2020/189559
PCT Pub. Date: Sep. 24, 2020

(65) Prior Publication Data
US 2022/0185937 A1 Jun. 16, 2022

(30) Foreign Application Priority Data

Mar. 20, 2019 (JP) .................. 2019-053676

(51) Int. Cl.
C08F 297/04 (2006.01)
C08L 23/00 (2006.01)
C08L 53/02 (2006.01)

(52) U.S. Cl.
CPC ............ *C08F 297/04* (2013.01); *C08L 23/00* (2013.01); *C08L 53/02* (2013.01)

(58) Field of Classification Search
CPC .......... C08L 23/00; C08L 23/10; C08L 23/12; C08L 23/14; C08L 53/005; C08L 53/02; C08L 53/025; C08F 8/04; C08F 293/00; C08F 293/005; C08F 297/04
See application file for complete search history.

(56) References Cited

U.S. PATENT DOCUMENTS

| | | | |
|---|---|---|---|
| 6,699,941 B1 | 3/2004 | Handlin et al. | |
| 2003/0176575 A1 | 9/2003 | Sugimoto et al. | |
| 2004/0039128 A1 | 2/2004 | Sasagawa et al. | |
| 2005/0234193 A1 | 10/2005 | Sasagawa et al. | |
| 2008/0161485 A1 | 7/2008 | Suzuki et al. | |
| 2010/0087559 A1 | 4/2010 | Kusanose et al. | |
| 2016/0297956 A1 | 10/2016 | Sasaki et al. | |
| 2017/0145206 A1 | 5/2017 | Kamei et al. | |
| 2019/0016842 A1 | 1/2019 | Kamei et al. | |

FOREIGN PATENT DOCUMENTS

| | | |
|---|---|---|
| CN | 1662562 A | 8/2005 |
| CN | 102119190 A | 7/2011 |
| JP | H09-327893 A | 12/1997 |
| JP | 2001-049052 A | 2/2001 |
| JP | 2003-321592 A | 11/2003 |
| JP | 2005-126657 A | 5/2005 |
| JP | 2007-039662 A | 2/2007 |
| JP | 2009-161774 A | 7/2009 |
| JP | 2009-242463 A | 10/2009 |
| JP | 2010-053319 A | 3/2010 |
| JP | 2010-090267 A | 4/2010 |
| JP | 2010-235771 A | 10/2010 |
| JP | 2012-162696 A | 8/2012 |
| WO | 03/035705 A1 | 5/2003 |
| WO | 2010/018743 A1 | 2/2010 |
| WO | 2015/156289 A1 | 10/2015 |
| WO | 2017/126469 A1 | 7/2017 |

OTHER PUBLICATIONS

International Search Report issued in corresponding International Patent Application No. PCT/JP2020/011123 dated Jun. 2, 2020.
International Preliminary Report on Patentability and Written Opinion issued in corresponding International Patent Application No. PCT/JP2020/011123 dated Sep. 30, 2021.
European Search Report issued in corresponding European Patent Application No. 20773933.5 dated Mar. 25, 2022.

*Primary Examiner* — John M Cooney
*Assistant Examiner* — Jeffrey S Lenihan
(74) *Attorney, Agent, or Firm* — Morgan, Lewis & Bockius LLP

(57) ABSTRACT

The present invention provides a hydrogenated block copolymer that is a hydrogenated product of a copolymer containing a vinyl aromatic compound monomer unit and a conjugated diene monomer unit, and that satisfies the following conditions (1) to (3):

(1) at least one of specific polymer blocks (b) and (c) is contained;
(2) elongation at break measured in accordance with JIS K 6251 is 1000% or more; and
(3) the hydrogenated block copolymer has at least one peak of tan δ in a viscoelasticity measurement chart at −25° C. or more and 80° C. or less.

15 Claims, No Drawings

HYDROGENATED BLOCK COPOLYMER

TECHNICAL FIELD

The present invention relates to a hydrogenated block copolymer.

More particularly, the present invention relates to a hydrogenated block copolymer that is a hydrogenated product of a copolymer containing a conjugated diene monomer unit and a vinyl aromatic monomer unit.

BACKGROUND ART

Vehicle interior materials have conventionally been required to be well balanced among wear resistance, a low-temperature characteristic, and mechanical strength. As such materials, olefin-based resins are principally used.

In order to cope with weight reduction of vehicle components, need for environment-related issues such as recyclability and incineration easiness, heat resistance, cold resistance, heat aging resistance, light resistance, unpleasant odor, and cheap-looking in appearance, however, styrene-based thermoplastic elastomer materials (hereinafter sometimes simply abbreviated as "TPS") have been put to practical use in recent years.

In addition, in accordance with recent demands for car sharing and self-driving cars, TPS materials that can retain wear resistance at higher level and flexibility (such as low-temperature elongation) even in a cold region are demanded as the vehicle interior materials. For meeting such demands, for example, Patent Document 1 discloses that a random copolymer styrene-based elastomer having a content of a vinyl aromatic hydrocarbon of 40% by mass or more and less than 95% by mass is effective for improvement of wear resistance when formed into a composition molded article with a polypropylene resin.

LIST OF PRIOR ART DOCUMENTS

Patent Document

Patent Document 1: International Publication No. WO03/035705

SUMMARY OF INVENTION

Problems to be Solved by Invention

The random copolymer styrene-based elastomer described in Patent Document 1 is, however, insufficient in the level of wear resistance required in recent years, and since the dispersibility in a polypropylene resin is low, it has a problem to be improved in low-temperature elongation when formed into a composition with the polypropylene resin. Besides, since a strand is easily broken when extruded, it has a problem to be improved in extrusion moldability.

Therefore, an object of the present invention is to provide a hydrogenated block copolymer capable of providing a composition improved in a balance among wear resistance, low-temperature elongation, and extrusion moldability, and a molded article (such as a vehicle interior material) of the composition of the hydrogenated block copolymer.

Means for Solving Problems

The present inventors have conducted diligent studies to solve the above-described problems of the conventional technique, and consequently completed the present invention by finding that a hydrogenated block copolymer having a specific structure, having elongation at break equal to or larger than a specific value, and having a peak of tan δ (loss tangent) in a viscoelasticity measurement chart in a specific temperature region can provide a composition improved in wear resistance, low-temperature elongation, and extrusion moldability. Specifically, the present invention is as follows:

[1]

A hydrogenated block copolymer that is a hydrogenated product of a copolymer comprising a vinyl aromatic compound monomer unit and a conjugated diene monomer unit, and that satisfies the following conditions (1) to (3):

(1) the hydrogenated block copolymer comprises at least one of the following polymer blocks (b) and (c):
  a hydrogenated copolymer block (b) comprising a vinyl aromatic compound monomer unit and a conjugated diene monomer unit; and
  a hydrogenated polymer block (c) principally comprising a conjugated diene monomer unit;
(2) the hydrogenated block copolymer has elongation at break measured in accordance with JIS K 6251 of 1000% or more; and
(3) the hydrogenated block copolymer has at least one peak of tan δ in a viscoelasticity measurement chart at −25° C. or more and 80° C. or less.

[2]

The hydrogenated block copolymer according to [1], wherein a total content of a vinyl aromatic compound monomer unit adjacent to a conjugated diene monomer unit is 1 to 13% by mass.

[3]

The hydrogenated block copolymer according to [1] or [2], wherein a vinyl bond content in the hydrogenated polymer block (c) is 50% by mass or more.

[4]

The hydrogenated block copolymer according to any of [1] to [3], wherein a vinyl bond content in the conjugated diene monomer unit is 50% by mass or more.

[5]

The hydrogenated block copolymer according to any of [1] to [4], having at least one peak of tan δ in the viscoelasticity measurement chart at less than −25° C.

[6]

The hydrogenated block copolymer according to any of [1] to [5], comprising, at at least one end, a hydrogenated copolymer block including any one of structures of the following formulas (i) to (iii), wherein a content of the hydrogenated polymer block (c) is 0 to 10% by mass and a content of a polymer block (a) is 0 to 2% by mass in the one end:

[Structure at One End]

(b)-                                                        (i);

(c-b)-                                                (ii); and (a-b)-                                              (iii), wherein a represents the polymer block (a) principally comprising a vinyl aromatic compound monomer unit, b represents the hydrogenated copolymer block (b) comprising a vinyl aromatic compound monomer unit and a conjugated diene monomer unit, and c represents the hydrogenated polymer block (c) principally comprising a conjugated diene monomer unit.

[7]
The hydrogenated block copolymer according to any of [1] to [6], comprising the hydrogenated copolymer block (b) at at least one end.

[8]
The hydrogenated block copolymer according to any of [1] to [7], wherein a content of the hydrogenated copolymer block (b) is 0.5 to 35% by mass.

[9]
The hydrogenated block copolymer according to any of [1] to [8], wherein a content of all vinyl aromatic compound monomer units is 10 to 80% by mass.

[10]
The hydrogenated block copolymer according to any of [1] to [9], further comprising at least one polymer block (a) principally comprising a vinyl aromatic compound monomer unit.

[11]
The hydrogenated block copolymer according to [10], wherein a content of the polymer block (a) is 3 to 30% by mass.

[12]
The hydrogenated block copolymer according to any of [1] to [11], having a weight average molecular weight of 50,000 to 600,000.

[13]
A hydrogenated block copolymer composition, comprising:
  the hydrogenated block copolymer (I) according to any of [1] to [12]; and
  at least one olefin-based resin (II).

[14]
A hydrogenated block copolymer composition, comprising:
  0.1 to 95% by mass of the hydrogenated block copolymer (I) according to any of [1] to [12];
  0.1 to 95% by mass of at least one olefin-based resin (II); and
  0.1 to 99.8% by mass of a hydrogenated block copolymer (III) that is a hydrogenated product of a copolymer comprising a vinyl aromatic compound monomer unit and a conjugated diene monomer unit, and that satisfies the following conditions (4) to (10):
  (4) the hydrogenated block copolymer comprises a polymer block (A) principally comprising a vinyl aromatic compound monomer unit and/or a polymer block (C) principally comprising a conjugated diene monomer unit;
  (5) the hydrogenated block copolymer comprises a random copolymer block (B) containing a conjugated diene monomer unit and a vinyl aromatic compound monomer unit;
  (6) the hydrogenated block copolymer has a content of all vinyl aromatic compound monomer units of 5% by mass or more and 95% by mass or less;
  (7) the hydrogenated block copolymer has a weight average molecular weight of 30,000 to 1,000,000;
  (8) 75% or more of double bonds in conjugated diene monomer units are hydrogenated;
  (9) the hydrogenated block copolymer has at least one peak of tan δ in a viscoelasticity measurement chart at −25° C. or more and 80° C. or less; and
  (10) the hydrogenated block copolymer has a content of the random copolymer block (B) of over 35% by mass.

[15]
The hydrogenated block copolymer composition according to [13] or [14], wherein the olefin-based resin (II) comprises at least one polypropylene-based resin.

[16]
A molded article of the hydrogenated block copolymer composition according to any of [13] to [15].

Advantages of Invention

According to the present invention, a hydrogenated block copolymer composition excellent in wear resistance, low-temperature elongation, and extrusion moldability can be obtained.

MODE FOR CARRYING OUT INVENTION

Hereinafter, the mode for carrying out the present invention (hereinafter referred to as the "present embodiment") will be described in detail. It is noted that the present invention is not limited to the following embodiment, but can be practiced with various changes and modifications made within the scope thereof.

[Hydrogenated Block Copolymer (I)]

A hydrogenated block copolymer (I) of the present embodiment is a hydrogenated product of a copolymer containing a vinyl aromatic compound monomer unit and a conjugated diene monomer unit, and satisfies the following conditions (1) to (3):
  (1) The hydrogenated block copolymer contains at least one of the following polymer blocks (b) and (c):
    a hydrogenated copolymer block (b) containing a vinyl aromatic compound monomer unit and a conjugated diene monomer unit (hereinafter also referred to simply as the "hydrogenated copolymer block (b)" or "polymer block (b)"); and
    a hydrogenated polymer block (c) principally containing a conjugated diene monomer unit (hereinafter also referred to simply as the "hydrogenated polymer block (c)" or "polymer block (c)");
  (2) the hydrogenated block copolymer has elongation at break measured in accordance with JIS K 6251 of 1000% or more; and
  (3) the hydrogenated block copolymer has at least one peak of tan δ in a viscoelasticity measurement chart at −25° C. or more and 80° C. or less.

Besides, the hydrogenated block copolymer (I) of the present embodiment preferably satisfies the following condition (4):
  (4) a total content of a vinyl aromatic compound monomer unit adjacent to a conjugated diene monomer unit is 1 to 13% by mass.

(Peak of Tan δ in Viscoelasticity Measurement Chart)

When the hydrogenated block copolymer (I) of the present embodiment has at least one peak of tan δ in the viscoelasticity measurement chart at −25° C. or more and 80° C. or less, a good balance between wear resistance and low-temperature elongation can be obtained in a hydrogenated block copolymer composition to be finally obtained. When the hydrogenated block copolymer (I) of the present embodiment has at least one peak of tan δ in the viscoelasticity measurement chart at −10° C. or more and 30° C. or less, a better balance between wear resistance and low-temperature elongation can be obtained in the hydrogenated block copolymer composition to be finally obtained.

(Vinyl Aromatic Compound Monomer Unit)

The vinyl aromatic compound monomer unit contained in the hydrogenated block copolymer is not especially limited, and examples include monomer units derived from styrene, α-methylstyrene, p-methylstyrene, divinylbenzene, 1,1-diphenylethylene, N,N-dimethyl-p-aminoethylstyrene, N,N-diethyl-p-aminoethylstyrene and the like. In particular, from the viewpoint of a balance between cost and mechanical strength, styrene is preferred. One of these monomer units may be singly used, or two or more of these may be used together.

(Conjugated Diene Monomer Unit)

The conjugated diene monomer unit contained in the hydrogenated block copolymer refers to a monomer unit derived from diolefin having a pair of conjugated double bonds. Such diolefin is not especially limited, and examples include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. In particular, from the viewpoint of a balance between good moldability and mechanical strength, 1,3-butadiene and isoprene are preferred.

One of these may be singly used, or two or more of these may be used together.

In the hydrogenated block copolymer (I) of the present embodiment, a vinyl bond content in the conjugated diene monomer unit is preferably 50% by mass or more. When the vinyl bond content in the conjugated diene monomer unit is 50% by mass or more, in a hydrogenated block copolymer composition to be finally obtained, wear resistance, low-temperature elongation, and extrusion moldability tend to be improved. From a similar viewpoint, in the hydrogenated block copolymer (I) of the present embodiment, the vinyl bond content in the conjugated diene monomer unit is more preferably 55% by mass or more, and further preferably 60% by mass or more.

Besides, in the hydrogenated block copolymer (I) of the present embodiment, a vinyl bond content in the hydrogenated polymer block (c) principally containing a conjugated diene monomer unit is preferably 50% by mass or more in order to retain wear resistance, low-temperature elongation, and extrusion moldability.

The hydrogenated block copolymer (I) of the present embodiment preferably contains the hydrogenated copolymer block (b) at at least one end thereof. The hydrogenated block copolymer of the present embodiment may have the hydrogenated copolymer block (b) at both ends thereof. A content of the hydrogenated copolymer block (b) at one end is preferably 0.5% by mass to 35% by mass, more preferably 1% by mass to 30% by mass, and further preferably 1.5% by mass to 25% by mass.

Besides, it is preferable that the hydrogenated block copolymer (I) of the present embodiment contains, at at least one end, a hydrogenated copolymer block having a structure of any one of the following formulas (i) to (iii), and that a content of the hydrogenated block copolymer (c) is 0 to 10% by mass, and a content of the polymer block (a) is 0 to 2% by mass at the one end.

[Structure at One End]

$$(b)\text{-} \quad (i);$$

$$(c\text{-}b)\text{-} \quad (ii); \text{ and}$$

$$(a\text{-}b)\text{-} \quad (iii),$$

wherein a represents the polymer block (a) principally containing a vinyl aromatic compound monomer unit, b represents the hydrogenated copolymer block (b) containing a vinyl aromatic compound monomer unit and a conjugated diene monomer unit, and c represents the hydrogenated polymer block (c) principally containing a conjugated diene monomer unit.

It is preferable that the hydrogenated block copolymer (I) of the present embodiment contains, at at least one end, the hydrogenated copolymer block including the structure of any one of the aforementioned formulas (i) to (iii), and that the content of the hydrogenated polymer block (c) is 0 to 10% by mass and the content of the polymer block (a) is 0 to 2% by mass at the one end because a good balance among low-temperature elongation, wear resistance, and extrusion moldability is thus obtained. Besides, from a similar viewpoint, the content of the hydrogenated polymer block (c) at the one end is more preferably 0 to 9% by mass, and further preferably 0 to 5% by mass, and the content of the polymer block (a) at the one end is more preferably 0 to 1.5% by mass, and further preferably 0 to 1% by mass.

It is noted that the structures and the contents of the polymer blocks at one end can be measured by methods described in examples below.

<Elongation at Break Measured in Accordance with JIS K 6251>

The hydrogenated block copolymer (I) of the present embodiment has elongation at break measured in accordance with JIS K 6251 of 1,000% or more, preferably 1,200% or more, and further preferably 1,400% or more. An upper limit of the elongation at break is not especially limited, and is, for example, 5,000%. A method for obtaining the hydrogenated block copolymer (I) having the elongation at break of 1,000% or more is not especially limited, and for example, a method in which the vinyl bond content and the weight average molecular weight of the conjugated diene monomer unit, the content of the polymer block (a), the content of the hydrogenated copolymer block (b), and a hydrogenation rate of double bonds in the conjugated diene monomer unit are respectively appropriately adjusted can be employed.

For example, when the vinyl bond content in the conjugated diene monomer unit contained in the hydrogenated block copolymer (I) is increased, the elongation at break can be retained at 1,000% or more, and specifically, the vinyl bond content is preferably 50% by mass or more, and more preferably 55% by mass or more.

Besides, in order to keep the elongation at break of 1,000% or more, the weight average molecular weight is preferably 50,000 to 600,000, more preferably 70,000 to 400,000, and further preferably 100,000 to 300,000.

Furthermore, when a content of a polymer block (a) principally containing a vinyl aromatic compound monomer unit described below (hereinafter also referred to as simply the "polymer block (a)") is reduced, the elongation at break can be kept at 1,000% or more, and specifically, the content of the polymer block (a) is preferably 30% by mass or less, preferably 25% by mass or less, and further preferably 20% by mass or less.

When the hydrogenation rate of the double bonds in the conjugated diene monomer unit contained in the hydrogenated block copolymer (I) is increased, the elongation at break can be kept at 1,000% or more, and specifically, the hydrogenation rate of the double bonds in the conjugated diene monomer unit contained in the hydrogenated block copolymer is preferably 0% or more, more preferably 50% or more, and further preferably 60% or more.

Besides, when the content of the hydrogenated copolymer block (b) is reduced, the content of the hydrogenated polymer block (c) is increased, and hence the elongation at break can be thus kept at 1,000% or more, and specifically, the content of the hydrogenated copolymer block (b) is preferably 35% by mass or less.

In the hydrogenated block copolymer (I) of the present embodiment, the content of all vinyl aromatic compound monomer units is preferably 10 to 80% by mass, more preferably 10 to 60% by mass, and further preferably 10 to 40% by mass. When the content of all vinyl aromatic compound monomer units falls the above-described range, wear resistance and extrusion moldability tend to be improved.

It is noted that the content of the all vinyl aromatic compound monomer units in the hydrogenated block copolymer can be measured in the present embodiment with a UV spectrophotometer using, as a sample, a copolymer before hydrogenation or a copolymer after hydrogenation.

In the present embodiment, it is noted that the term "to principally contain" in the structure of the hydrogenated block copolymer means that a ratio in a prescribed copolymer or copolymer block is 90% by mass or more.

(Polymer Block (a) Principally Containing Vinyl Aromatic Compound)

The hydrogenated block copolymer (I) of the present embodiment is not especially limited in whether or not it contains the polymer block (a) principally containing a vinyl aromatic compound monomer unit, and from the viewpoint of preventing pellet blocking, at least one polymer block (a) is preferably contained. Besides, the hydrogenated block copolymer (I) of the present embodiment tends to be improved in low-temperature elongation, wear resistance, and extrusion moldability when the content of the polymer block (a) is 30% by mass or less.

From a similar viewpoint, the content of the polymer block (a) in the hydrogenated block copolymer (I) of the present embodiment is more preferably 3 to 30% by mass, further preferably 5 to 28% by mass, and particularly preferably 7 to 25% by mass.

The content of the polymer block (a) principally containing a vinyl aromatic compound can be measured by a method in which a copolymer before hydrogenation is oxidatively decomposed with tertiary butyl hydroperoxide with osmium tetroxide used as a catalyst (method described in I. M. Kolthoff, et al., J. Polym. Sci. 1, 429 (1946); hereinafter referred to as the "osmium tetroxide method").

Alternatively, the content of the polymer block (a) principally containing a vinyl aromatic compound may be measured with a nuclear magnetic resonance apparatus (NMR) with a copolymer before hydrogenation or a copolymer after hydrogenation used as a sample (a method described in Y. Tanaka, et al., RUBBER CHEMISTRY and TECHNOLOGY 54, 685 (1981); hereinafter referred to as the "NMR method").

In this case, there is a correlation represented by the following expression between the content (represented by Os) of the polymer block (a) principally containing a vinyl aromatic compound measured by the osmium tetroxide method using a copolymer before hydrogenation and the content (represented by Ns) of the polymer block (a) principally containing a vinyl aromatic compound measured by the NMR method using a copolymer after hydrogenation:

$$(Os) = -0.012(Ns)^2 + 1.8(Ns) - 13.0 \quad (F)$$

Accordingly, in the present embodiment, when the content of the polymer block (a) principally containing a vinyl aromatic compound in a copolymer after hydrogenation is to be obtained by the NMR method, a value of the (Os) obtained in accordance with the expression (F) is regarded as the content of the polymer block (a) principally containing a vinyl aromatic compound defined in the present embodiment.

(Hydrogenated Copolymer Block (b))

The hydrogenated copolymer block (b) contains a vinyl aromatic compound monomer unit and a conjugated diene monomer unit.

A content of the vinyl aromatic compound monomer unit in the hydrogenated copolymer block (b) is preferably 5% by mass to 80% by mass, more preferably 45% by mass to 75% by mass, and further preferably 50% by mass to 70% by mass.

When the content of the vinyl aromatic compound monomer unit in the hydrogenated copolymer block (b) is 80% by mass or less, the hydrogenated block copolymer composition to be finally obtained tends to be improved in elongation at break. On the other hand, when the content of the vinyl aromatic compound monomer unit in the hydrogenated copolymer block (b) is 5% by mass or more, the hydrogenated block copolymer composition to be finally obtained tends to be improved in wear resistance.

The content of the hydrogenated copolymer block (b) in the hydrogenated block copolymer (I) of the present embodiment is preferably 0.5% by mass to 35% by mass, more preferably 1% by mass to 30% by mass, and further preferably 1.5% by mass to 25% by mass from the viewpoint of obtaining a good balance between elongation at break and wear resistance of the hydrogenated block copolymer composition to be finally obtained. When the content of the hydrogenated copolymer block (b) is 35% by mass or less, the hydrogenated block copolymer composition to be finally obtained is improved in dispersibility of an olefin-based resin (II) described later, and improved in wear resistance, low-temperature elongation, and extrusion moldability.

It is noted that the content of the hydrogenated copolymer block (b) in the hydrogenated block copolymer (I) can be measured with a nuclear magnetic resonance apparatus (NMR) or the like in the present embodiment.

A vinyl bond content in a conjugated diene portion of a copolymer block before hydrogenation of the hydrogenated copolymer block (b) can be controlled, for example, using a modifier such as a tertiary amine compound or an ether compound described below.

When 1,3-butadiene is used as the conjugated diene, from the viewpoint of obtaining a good balance between wear resistance and low-temperature elongation in the hydrogenated block copolymer composition to be finally obtained, a 1,2-vinyl bond content in the conjugated diene portion of the copolymer block before hydrogenation of the hydrogenated copolymer block (b) is preferably 5 to 70% by mass, and more preferably 10 to 60% by mass.

When isoprene is used as the conjugated diene, or when 1,3-butadiene and isoprene are used together, a total content of a 1,2-vinyl bond and a 3,4-vinyl bond is preferably 3 to 75% by mass, and more preferably 5 to 60% by mass.

It is noted that the total content of a 1,2-vinyl bond and a 3,4-vinyl bond (a 1,2-vinyl bond content when 1,3-butadiene is used as the conjugated diene, however) is designated as the vinyl bond content in the present embodiment.

The vinyl bond content can be measured through measurement with an infrared spectrophotometer using a copolymer before hydrogenation as a sample (for example, by a Hampton method).

In the hydrogenated block copolymer (I) of the present embodiment, when compatibility with a hydrogenated block copolymer (III) described later is retained, the hydrogenated block copolymer composition to be finally obtained tends to be improved in low-temperature elongation. In other words, the hydrogenated copolymer block (b) is preferably contained at at least one end of the hydrogenated block copolymer (I).

In the hydrogenated block copolymer (I) of the present embodiment, a vinyl aromatic compound monomer unit adjacent to a conjugated diene monomer unit is preferably present principally in the hydrogenated copolymer block (b). A method for controlling the amount of a vinyl aromatic compound monomer unit adjacent to a conjugated diene monomer unit among vinyl aromatic compound monomer units contained in the hydrogenated copolymer block (b) will be described later.

(Hydrogenated Polymer Block (c) Principally Containing Conjugated Diene Monomer Unit)

The hydrogenated polymer block (c) principally contains a conjugated diene monomer unit.

In the hydrogenated block copolymer (I) of the present embodiment, a content of the hydrogenated polymer block (c) is preferably 10% by mass to 85% by mass, more preferably 15% by mass to 80% by mass, and further preferably 30% by mass to 80% by mass from the viewpoint of low-temperature elongation and extrusion moldability of the hydrogenated block copolymer composition to be finally obtained.

A vinyl bond in the conjugated diene monomer unit after hydrogenation contained in the hydrogenated polymer block (c) has a chemical structure similar to that of the olefin-based resin (II) described later. Therefore, a vinyl bond content in the conjugated diene monomer unit before hydrogenation contained in the hydrogenated polymer block (c) affects compatibility with the olefin-based resin (II), and in order to improve the compatibility to obtain good low-temperature elongation, extrusion moldability, and wear resistance of the hydrogenated block copolymer composition to be finally obtained, the vinyl bond content is preferably 50% by mass or more, more preferably 55% by mass or more, and further preferably 60% by mass or more.

<Tan δ (Loss Tangent) in Viscoelasticity Measurement Chart of Hydrogenated Block Copolymer (I)>

The hydrogenated block copolymer (I) of the present embodiment has at least one peak of tan δ (loss tangent) in a viscoelasticity measurement chart at −25° C. or more and 80° C. or less, preferably at −15° C. or more and 60° C. or less, and more preferably at −10° C. or more and 40° C. or less.

This peak of tan δ is a peak derived from the hydrogenated copolymer block (b) contained in the hydrogenated block copolymer (I). The presence of at least one peak in the range of −25° C. or more and 80° C. or less is significant for retaining good wear resistance in the hydrogenated block copolymer composition to be finally obtained.

As described above, the hydrogenated copolymer block (b) is obtained by hydrogenating a non-hydrogenated random copolymer block containing a conjugated diene monomer unit and a vinyl aromatic monomer unit. In order that at least one peak of tan δ (loss tangent) is present in the range of −25° C. or more and 80° C. or less, it is effective to control the conjugated diene monomer unit/the vinyl aromatic monomer unit (mass ratio), and the conjugated diene monomer unit/the vinyl aromatic monomer unit (mass ratio) is preferably 75/25 to 10/90, more preferably 70/30 to 13/87, and particularly preferably 60/40 to 16/84.

Besides, the hydrogenated block copolymer (I) of the present embodiment has at least one peak of tan δ (loss tangent) in the viscoelasticity measurement chart, in addition to in the range of −25° C. or more and 80° C. or less, preferably at less than −25° C., more preferably at −60° C. or more and less than −25° C., and further preferably at −50° C. or more and less than −25° C. This peak of tan δ is a peak derived from the hydrogenated polymer block (c) contained in the hydrogenated block copolymer (I). At least one such peak of tan δ is present in the range less than −25° C. preferably for obtaining practically sufficient low-temperature elongation in the hydrogenated block copolymer composition to be finally obtained. In other words, the hydrogenated block copolymer (I) of the present embodiment preferably contains at least one hydrogenated polymer block (c).

It is noted that tan δ can be measured using a viscoelasticity measuring device (ARES, manufactured by TA Instruments) under conditions of a strain of 0.5%, a frequency of 1 Hz and a temperature increasing rate of 3° C./min. Specifically, it can be measured by a method described in an example later.

<Content of Vinyl Aromatic Compound Monomer Unit Adjacent to Conjugated Diene Monomer Unit>

In the hydrogenated block copolymer (I) of the present embodiment, a total content of a vinyl aromatic compound monomer unit adjacent to a conjugated diene monomer unit is preferably 1 to 13% by mass, more preferably 2 to 12% by mass, and further preferably 3 to 11% by mass. When the total content of a vinyl aromatic compound monomer unit adjacent to a conjugated diene monomer unit falls in the above-described range, the hydrogenated block copolymer (I) of the present embodiment can provide a composition further improved in the balance among wear resistance, low-temperature elongation, and extrusion moldability.

Besides, for example, in the hydrogenated copolymer block (b) containing a conjugated diene monomer unit and a vinyl aromatic compound monomer unit, it is preferable that there is a vinyl aromatic compound monomer unit adjacent to a conjugated diene monomer unit, and depending on the content and production conditions, some of vinyl aromatic compound monomer units may be adjacent to a vinyl aromatic compound monomer unit alone in some cases. Accordingly, it is preferable to control the content of a vinyl aromatic compound monomer unit adjacent to a conjugate diene monomer unit by adjusting not only a ratio between the conjugated diene monomer unit and the vinyl aromatic compound monomer unit but also other various conditions.

Basically, when a content (mass ratio) of a vinyl aromatic compound monomer unit is 79% by mass or less in a random block, it is presumed that the vinyl aromatic compound monomer unit is randomly (homogeneously) contained. In order to retain randomness, however, polymerization temperatures of the hydrogenated copolymer block (b) and the hydrogenated polymer block (c) are preferably set to 50° C. or more. As the polymerization temperature is set to be higher, the randomness in the resultant hydrogenated copolymer block is higher, and hence, the ratio of a vinyl aromatic compound monomer unit adjacent to a conjugated diene monomer unit tends to be higher. Besides, in order to increase the ratio of a vinyl aromatic compound monomer unit adjacent to a conjugated diene monomer unit, a prescribed modifier is preferably used. Examples of such a modifier include, but are not limited to, a tertiary amine compound, an ether compound, and a metal alcoholate compound. One of such modifiers may be singly used, or two or more of these may be used in combination.

In studying the compatibility between an olefin-based resin such as polypropylene (PP) and a hydrogenated block copolymer, the present inventors have found that not only the content of a vinyl aromatic compound monomer unit in a random block but also the homogeneity (randomness) thereof is significant. When not only the content of the vinyl aromatic compound monomer unit in the hydrogenated block copolymer (I) is adjusted but also the randomness thereof is increased, the compatibility with an olefin-based resin such as PP and the hydrogenated block copolymer (III) described later tends to be improved to improve wear resistance, low-temperature elongation, and extrusion moldability of the hydrogenated block copolymer composition. When not only the content of the vinyl aromatic compound monomer unit but also, for example, an amount determined, by NMR, as a vinyl aromatic compound monomer unit adjacent to a conjugated diene monomer unit is controlled to fall in the above-described ranges, the compatibility with the olefin-based resin tends to be further improved, and low-temperature elongation and the like of the hydrogenated block copolymer composition tend to be further improved.

Besides, when, for example, the polymerization temperature is increased, and a suitable modifier in an appropriate amount is added, a reaction rate of a vinyl aromatic compound becomes equivalent to a reaction rate of a conjugated diene compound. Therefore, a tapered distribution of a vinyl aromatic compound monomer unit in a random portion can be inhibited, and a total amount (A) of the content of a vinyl aromatic compound monomer unit adjacent to a conjugated diene monomer unit tends to be small as compared with an amount usually designed as the content of vinyl aromatic compound monomer units in the hydrogenated polymer block (b), or in the hydrogenated copolymer block (b) and the hydrogenated polymer block (c). In this manner, the total amount (A) can be controlled to fall in the above-described range by retaining random copolymerizability through adjustment of the type and the amount of a modifier, increase of the polymerization temperature, and the like.

It is noted that the content of a vinyl aromatic compound monomer unit adjacent to a conjugated diene monomer unit can be measured in the present embodiment with a nuclear magnetic resonance apparatus (NMR) with a block copolymer before hydrogenation used (a method described in Y. Tanaka, et al., RUBBER CHEMISTRY and TECHNOLOGY 54, 685 (1981); hereinafter referred to as the "NMR method").

<Weight Average Molecular Weight of Hydrogenated Block Copolymer (I)>

The weight average molecular weight of the hydrogenated block copolymer (I) of the present embodiment is preferably 50,000 to 600,000, more preferably 70,000 to 500,000, and further preferably 100,000 to 400,000 from the viewpoint of obtaining a good balance among heat resistance, mechanical strength, and flowability (moldability) in the hydrogenated block copolymer composition to be finally obtained.

It is noted that the weight average molecular weight of the hydrogenated block copolymer (I) is obtained, in the present embodiment, through measurement by gel permeation chromatography (GPC) using a calibration curve obtained by measurement of commercially available standard polystyrene (created by using a peak molecular weight of the standard polystyrene).

<Molecular Weight Distribution of Hydrogenated Block Copolymer (I)>

A molecular weight distribution of the hydrogenated block copolymer (I) of the present embodiment can be obtained through measurement by GPC, and calculated based on a ratio between the weight average molecular weight and a number average molecular weight.

The molecular weight distribution of the hydrogenated block copolymer (I) of the present embodiment is preferably 10 or less, more preferably 8 or less, and further preferably 5 or less.

<Hydrogenation Rate of Double Bonds of Conjugated Diene Monomer Unit in Hydrogenated Block Copolymer (I)>

A hydrogenation rate of double bonds in the conjugated diene monomer unit in the hydrogenated block copolymer (I) of the present embodiment is preferably 75% or more, more preferably 80% or more, and further preferably 85% or more from the viewpoint of obtaining good heat resistance and weather resistance in the hydrogenated block copolymer composition to be finally obtained.

<Hydrogenation Rate of Aromatic Double Bond of Vinyl Aromatic Compound Unit in Hydrogenated Block Copolymer (I)>

A hydrogenation rate of an aromatic double bond in the vinyl aromatic compound unit in the hydrogenated block copolymer (I) of the present embodiment is not especially limited, and is preferably 50% or less, more preferably 30% or less, and further preferably 20% or less.

Here, the hydrogenation rate of the hydrogenated block copolymer (I) can be measured with a nuclear magnetic resonance apparatus (NMR) or the like.

<Crystallization Peak of Hydrogenated Block Copolymer (I)>

The hydrogenated block copolymer (I) of the present embodiment is preferably a hydrogenated product that has substantially no crystallization peak derived from the above-described hydrogenated copolymer block (b) in a range of −25° C. to 80° C. in a differential scanning calorimetry (DSC) chart.

Here, the term "does not substantially have a crystallization peak derived from the hydrogenated copolymer block (b) in a range of −25° C. to 80° C." means the following. In this temperature range, a peak derived from crystallization of a portion of the hydrogenated polymer block (b) does not appear, or even when a peak derived from the crystallization is observed, a crystallization peak calorific value resulting from the crystallization is less than 3 J/g, preferably less than 2 J/g, more preferably less than 1 J/g, and still more preferably none.

As described above, when there is substantially no crystallization peak derived from the hydrogenated copolymer block (b) in the range of −25° C. to 80° C., the hydrogenated block copolymer (I) of the present embodiment attains good flexibility, and the hydrogenated block copolymer composition to be finally obtained can be suitably softened.

In order to obtain the hydrogenated block copolymer (I) that does not substantially have a crystallization peak derived from the hydrogenated copolymer block (b) in the range of −25° C. to 80° C., a copolymer obtained by a polymerization reaction performed under conditions described later using a prescribed modifier for adjusting the vinyl bond content and adjusting copolymerizability between the vinyl aromatic compound and the conjugated diene may be subjected to a hydrogenation reaction.

<Structure of Hydrogenated Block Copolymer (I)>

The structure of the hydrogenated block copolymer (I) of the present embodiment is not especially limited, and examples include structures represented by the following general formulas:

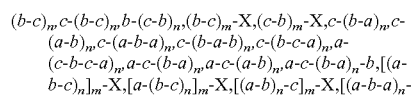

c]$_m$-X,[(b-a-b)$_n$-c]$_m$-X,[(c-b-a)$_n$]$_m$-X,[c-(b-a)$_n$]$_m$-X,[c-(a-b-a)$_n$]$_m$-X, and [c-(b-a-b)$_n$]$_m$-X.

In these general formulas, a represents the polymer block (a) principally containing a vinyl aromatic monomer unit, b represents the hydrogenated copolymer block (b) containing a vinyl aromatic monomer unit and a conjugated diene monomer unit, and c represents the hydrogenated polymer block (c) principally containing a conjugated diene monomer unit.

Also, in these general formulas, n represents an integer of 1 or more, and is preferably an integer of 1 to 5;

m represents an integer of 2 or more, and is preferably an integer of 2 to 11; and X represents a residue of a coupling agent or a residue of a multifunctional initiator.

When each of the block (a), the block (b) and the block (c) is present in a plural number in the hydrogenated block copolymer (I) of the present embodiment, the structures such as the molecular weights and the compositions may be the same or different. Besides, a boundary between the blocks need not be clearly distinguished.

A distribution of the vinyl aromatic compound monomer unit in the hydrogenated block copolymer (I) of the present embodiment is not especially limited, and the distribution may be uniform, tapered, stepwise, convex, or concave. Besides, there may coexist a plurality of distribution forms of the vinyl aromatic compound. Furthermore, there may coexist a plurality of segments having different contents of the vinyl aromatic compound monomer unit in the hydrogenated block copolymer (I) of the present embodiment.

In the hydrogenated block copolymer (I) of the present embodiment, a distribution of a vinyl bond unit in each of the blocks (a) to (c) is not especially limited, and there may be a distribution. The distribution of a vinyl bond can be controlled by adding a modifier described below during polymerization, or changing the temperature during the polymerization.

There may be a distribution of the hydrogenation rate of the conjugated diene monomer unit in the hydrogenated block copolymer (I) of the present embodiment. The distribution of the hydrogenation rate can be controlled by changing the distribution of a vinyl bond unit, or by a method, for example, in which isoprene and butadiene are copolymerized with each other, and the resultant is hydrogenated with a hydrogenation catalyst described below to utilize a difference in the hydrogenation speed between an isoprene unit and a butadiene unit.

The hydrogenated block copolymer (I) of the present embodiment preferably has the structure of including the hydrogenated copolymer block (b) at at least one end from the viewpoint of improving compatibility with a random copolymer block (B) contained in the hydrogenated block copolymer (III) described below to obtain good wear resistance, low-temperature elongation, and extrusion moldability in the hydrogenated block copolymer composition to be finally obtained. The random copolymer block (B) contained in the hydrogenated block copolymer (III) described below can be more easily approached when the hydrogenated block copolymer (I) has the hydrogenated copolymer block (b) at the end than when it has the hydrogenated copolymer block (b) inside, and therefore, compatibility with the random copolymer block (B) contained in the hydrogenated block copolymer (III) can be easily obtained when it has the hydrogenated copolymer block (b) at the end.

The hydrogenated block copolymer (I) of the present embodiment preferably has a structure including the hydrogenated polymer block (c) from the viewpoints of improving the compatibility with the olefin-based resin (II) described below, and obtaining good wear resistance and low-temperature elongation in the hydrogenated block copolymer composition to be finally obtained.

Specifically, among the general formulas representing the structure of the hydrogenated block copolymer (I) of the present embodiment, (b-c)n, b-(c-b)n, (b-c)m-X, c-(a-b)n, c-(b-a-b)n, a-c-(a-b)n, a-c-(b-a)n-b, and [(b-a-b)n-c]m-X are preferred, and (b-c)n, b-(c-b)n, (b-c)m-X, c-(a-b)n, c-(b-a-b)n, a-c-(a-b)n, a-c-(b-a)n-b, and [(b-a-b)n-c]m-X are more preferred.

The hydrogenated block copolymer (I) of the present embodiment may be an arbitrary mixture of copolymers respectively having the structures represented by the aforementioned general formulas.

Other Examples of Structure of Hydrogenated Block Copolymer (I)

The hydrogenated block copolymer (I) of the present embodiment may be a modified block copolymer in which atomic groups each having a prescribed functional group are bonded to one another.

The modified block copolymer may be a secondary modified block copolymer.

<Production Method for Hydrogenated Block Copolymer (I)>

A block copolymer corresponding to a state obtained before the hydrogenation of the hydrogenated block copolymer (I) of the present embodiment is obtained, for example, by living anionic polymerization of a vinyl aromatic compound and a conjugated diene compound performed in a hydrocarbon solvent by using a polymerization initiator such as an organic alkali metal compound.

(Solvent)

Examples of the hydrocarbon solvent include, but are not especially limited to, aliphatic hydrocarbons such as n-butane, isobutane, n-pentane, n-hexane, n-heptane and n-octane, alicyclic hydrocarbons such as cyclohexane, cycloheptane and methylcycloheptane, and aromatic hydrocarbons such as benzene, toluene, xylene and ethylbenzene.

(Polymerization Initiator)

The polymerization initiator is not especially limited, and for example, organic alkali metal compounds such as an aliphatic hydrocarbon alkali metal compound, an aromatic hydrocarbon alkali metal compound and an organic amino alkali metal compound, which are known to have anionic polymerization activity on a vinyl aromatic compound and a conjugated diene, can be generally applied.

Preferable examples of the organic alkali metal compounds include, but are not especially limited to, aliphatic and aromatic hydrocarbon lithium compounds having 1 to 20 carbon atoms, and a compound containing one lithium in one molecule, and a dilithium compound, a trilithium compound and a tetralithium compound each containing a plurality of lithiums in one molecule can be applied. Specific examples include n-propyllithium, n-butyllithium, sec-butyllithium, tert-butyllithium, n-pentyllithium, n-hexyllithium, benzyllithium, phenyllithium, trityllithium, a reaction product of diisopropylbenzene and sec-butyllithium, and a reaction product of divinylbenzene, sec-butyllithium and a small amount of 1,3-butadiene.

In addition, organic alkali metal compounds disclosed in, for example, U.S. Pat. No. 5,708,092, British Patent No. 2,241,239, and U.S. Pat. No. 5,527,753 can be applied.

(Modifier)

For example, when a vinyl aromatic compound and a conjugated diene are copolymerized by using an organic alkali metal compound as a polymerization initiator, a content of vinyl bonds (such as 1,2-bond or 3,4-bond) derived from the conjugated diene incorporated into a resultant polymer, and random copolymerizability between the vinyl aromatic compound and the conjugated diene can be adjusted by using a prescribed modifier.

Such a modifier is not especially limited, and for example, a tertiary amine compound, an ether compound, or a metal alcoholate compound may be added.

One of these modifiers may be singly used, or two or more of these may be used in combination.

An example of the tertiary amine compound includes, but is not especially limited to, a compound represented by a general formula R1R2R3N (wherein R1, R2 and R3 represent a hydrocarbon group having 1 to 20 carbon atoms, or a hydrocarbon group having a tertiary amino group).

Specific examples include, but are not especially limited to, trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine.

Examples of the ether compound include, but are not especially limited to, a linear ether compound and a cyclic ether compound.

Examples of the linear ether compound include, but are not especially limited to, dialkyl ether compounds of ethylene glycol, such as dimethyl ether, diethyl ether, diphenyl ether, ethylene glycol dimethyl ether, ethylene glycol diethyl ether, and ethylene glycol dibutyl ether; and dialkyl ether compounds of diethylene glycol, such as diethylene glycol dimethyl ether, diethylene glycol diethyl ether, and diethylene glycol dibutyl ether.

Examples of the cyclic ether compound include, but are not especially limited to, alkyl ethers such as tetrahydrofuran, dioxane, 2,5-dimethyloxolane, 2,2,5,5-tetramethyloxolane, 2,2-bis(2-oxolanyl)propane, and furfuryl alcohol.

Examples of the metal alcoholate compound include, but are not especially limited to, sodium-t-pentoxide, sodium-t-butoxide, potassium-t-pentoxide, and potassium-t-butoxide.

(Polymerization Method)

As a method for polymerizing a vinyl aromatic compound and a conjugated diene polymer by using, for example, an organic alkali metal compound as a polymerization initiator, a conventionally known method can be applied.

For example, the polymerization method may be, but is not especially limited to, any one of batch polymerization, continuous polymerization and a combination of these methods. In particular, for obtaining a copolymer excellent in heat resistance, batch polymerization is suitably employed.

A polymerization temperature is preferably 0° C. to 180° C., and more preferably 30° C. to 150° C. A polymerization time is varied depending on conditions, and is usually 48 hours or less, and preferably 0.1 to 10 hours.

As an atmosphere of a polymerization system, an inert gas atmosphere such as nitrogen gas is preferred.

A polymerization pressure is not especially limited as long as it is set within a pressure range where monomers and a solvent can be retained in a liquid phase in the above-described temperature range.

Attention is preferably paid so that an impurity inactivating a catalyst and a living polymer, such as water, oxygen and carbon dioxide, cannot enter the polymerization system.

In completing the polymerization process, a coupling reaction may be performed with a necessary amount of a bi- or higher functional coupling agent added thereto.

A bifunctional coupling agent is not especially limited, and any of conventionally known agents can be used. Examples include alkoxysilane compounds such as trimethoxysilane, triethoxysilane, tetramethoxysilane, tetraethoxysilane, dimethyldimethoxysilane, diethyldimethoxysilane, dichlorodimethoxysilane, dichlorodiethoxysilane, trichloromethoxysilane and trichloroethoxysilane; dihalogen compounds such as dichloroethane, dibromoethane, dimethyldichlorosilane and dimethyldibromosilane; and acid esters such as methyl benzoate, ethyl benzoate, phenyl benzoate, and phthalic esters.

A tri- or higher functional coupling agent is not especially limited, and any of known agents can be used. Examples include tri- or higher valent polyalcohols, polyvalent epoxy compounds such as epoxidized soybean oil, diglycidyl bisphenol A, and 1,3-bis(N-N'-diglycidylaminomethyl)cyclohexane; and polyvalent halogen compounds such as a silicon halide compound represented by a general formula $R_4\text{-nSiX}_n$ (wherein R represents a hydrocarbon group having 1 to 20 carbon atoms, X represents a halogen, and n represents an integer of 3 to 4), such as methyl silyl trichloride, t-butyl silyl trichloride, silicon tetrachloride, and a bromide of any of these, and a tin halide compound represented by a general formula $R_4\text{-nSnX}_n$ (wherein R represents a hydrocarbon group having 1 to 20 carbon atoms, X represents a halogen, and n represents an integer of 3 to 4), such as methyl tin trichloride, t-butyl tin trichloride, and tin tetrachloride. Alternatively, dimethyl carbonate, diethyl carbonate or the like may be used.

(Modification Process)

As described above, the hydrogenated block copolymer (I) of the present embodiment may be a modified block copolymer in which atomic groups each having a functional group are bonded to one another. The atomic groups having a functional group are bonded preferably in process preceding hydrogenation process described later.

The "atomic group having a functional group" is not especially limited, and an example includes an atomic group having at least one functional group selected from the group consisting of a hydroxyl group, a carboxyl group, a carbonyl group, a thiocarbonyl group, an acid halide group, an acid anhydride group, a carboxylic acid group, a thiocarboxylic acid group, an aldehyde group, a thioaldehyde group, a carboxylic ester group, an amide group, a sulfonic acid group, a sulfonic ester group, a phosphoric acid group, a phosphoric ester group, an amino group, an imino group, a nitrile group, a pyridyl group, a quinoline group, an epoxy group, a thioepoxy group, a sulfide group, an isocyanate group, an isothiocyanate group, a silicon halide group, a silanol group, an alkoxysilicone group, a tin halide group, a boronic acid group, a boron-containing group, a boronate group, an alkoxytin group, and a phenyltin group. In particular, an atomic group having at least one functional group selected from the group consisting of a hydroxyl group, an epoxy group, an amino group, a silanol group, and an alkoxysilane group is preferred.

The "atomic group having a functional group" is bonded with a denaturant.

The denaturant is not especially limited, and examples include tetraglycidyl methaxylene diamine, tetraglycidyl-1, 3-bisaminomethylcyclohexane, ε-caprolactone, δ-valerolactone, 4-methoxybenzophenone, γ-glycidoxyethyltrimethoxysilane, γ-glycidoxypropyltrimethoxysilane, γ-glycidoxypropyldimethylphenoxysilane, bis(γ-glycidoxypropyl)methylpropoxysilane, 1,3-dimethyl-2-imidazolidine, 1,3-diethyl-2-imidazolidinone, N,N'-dimethylpropyleneurea, and N-methylpyrrolidone.

Although not especially limited, the modified block copolymer can be obtained, for example, by anionic living polymerization for performing polymerization using a polymerization initiator having a functional group or an unsaturated monomer having a functional group, or for performing an addition reaction with a denaturant forming a functional group or having a functional group at a living end.

As another method for obtaining the modified block copolymer, a block copolymer is reacted (metalation reaction) with an organic alkali metal compound such as an organic lithium compound, and the thus obtained block polymer to which the organic alkali metal has been added is addition reacted with a denaturant having a functional group.

In employing the latter method, however, the metalation reaction can be performed after obtaining the hydrogenated block copolymer (I) and then the resultant can be reacted with a denaturant to produce a modified hydrogenated block copolymer.

A temperature for performing a modification reaction is preferably 0° C. to 150° C., and more preferably 20° C. to 120° C. A time necessary for the modification reaction is varied depending on the other conditions, and is preferably 24 hours or less, and more preferably 0.1 to 10 hours.

Depending on the type of a denaturant used, an amino group or the like has been sometimes generally changed into an organic metal salt when the denaturant is reacted, and in such a case, the organic metal salt can be converted into an amino group or the like through a treatment with water or a compound having active hydrogen such as alcohol. It is noted that such a modified copolymer may partially contain a non-modified copolymer.

The above-described modified block copolymer may be a secondary modified block copolymer. A secondary modified block copolymer can be obtained by reacting a modified block copolymer with a secondary denaturant reactive with a functional group of the modified block copolymer.

The secondary denaturant is not especially limited, and an example includes a denaturant having a functional group selected from the group consisting of a carboxyl group, an acid anhydride group, an isocyanate group, an epoxy group, a silanol group, and an alkoxysilane group, and the secondary denaturant has at least two functional groups selected from these functional groups.

When the functional group is an acid anhydride group, however, the secondary denaturant may have merely one acid anhydride group.

When the modified block copolymer is reacted with the secondary denaturant as described above, the amount of the secondary denaturant used per equivalent of a functional group bonded to the modified block copolymer is preferably 0.3 moles to 10 moles, more preferably 0.4 moles to 5 moles, and further preferably 0.5 moles to 4 moles.

A method for reacting the modified block copolymer with the secondary denaturant is not especially limited, and any of known methods can be applied. Examples of the method include a melt kneading method described later, and a method in which respective components are dissolved or dispersed in a solvent or the like to be mixed for the reaction. It is noted that such secondary modification is performed preferably after the hydrogenation process.

As the secondary denaturant, specifically, maleic anhydride, pyromellitic anhydride, 1,2,4,5-benzenetetracarboxylic dianhydride, toluylene diisocyanate, tetraglycidyl-1,3-bisaminomethylcyclohexane, bis-(3-triethoxysilylpropyl)-tetrasulfane or the like are suitably used.

The hydrogenated block copolymer (I) of the present embodiment can be a modified block copolymer graft modified with α,β-unsaturated carboxylic acid or a derivative thereof, such as an anhydride, an esterified product, an amidated product, or an imidated product thereof.

The α,β-unsaturated carboxylic acid or a derivative thereof is not especially limited, and specific examples include maleic anhydride, maleic anhydride imide, acrylic acid or an ester thereof, methacrylic acid or an ester thereof, and endo-cis-bicyclo[2,2,1]-5-heptene-2,3-dicarboxylic acid or an anhydride thereof.

The amount of the α,β-unsaturated carboxylic acid or a derivative thereof to be added is, based on 100 parts by mass of the hydrogenated block copolymer (I), preferably 0.01 to 20 parts by mass, and more preferably 0.1 to 10 parts by mass.

A reaction temperature in the graft modification is preferably 100° C. to 300° C., and more preferably 120° C. to 280° C.

A specific method for the graft modification is not especially limited, and for example, a method described in Japanese Patent Laid-Open No. 62-79211 can be applied.

(Hydrogenation Reaction Process)

The hydrogenation block copolymer (I) of the present embodiment can be obtained by subjecting the above-described non-hydrogenated non-modified or modified block copolymer to a hydrogenation reaction using a prescribed hydrogenation catalyst.

The hydrogenation catalyst is not especially limited, and examples include known catalysts of (1) a supported heterogenous hydrogenation catalyst in which a metal such as Ni, Pt, Pd, or Ru is supported on carbon, silica, alumina, diatomaceous earth or the like, (2) what is called a Ziegler hydrogenation catalyst using an organic acid salt of Ni, Co, Fe, Cr or the like or a transition metal salt such as an acetylacetone salt, and a reducing agent such as organic aluminum, and (3) a homogenous hydrogenation catalyst such as what is called an organic metal complex of an organic metal compound or the like of Ti, Ru, Rh, Zr or the like.

Specific examples include, but are not especially limited to, hydrogenation catalysts described in Japanese Patent Publication Nos. 42-8704, 43-6636, 63-4841, 1-37970, 1-53851 and 2-9041.

Suitable examples of the hydrogenation catalyst include a titanocene compound, a reducing organometallic compound, and a mixture of these.

The titanocene compound is not especially limited, and for example, a compound described in Japanese Patent Laid-Open Publication No. 8-109219 can be used. A specific example includes, but is not especially limited to, a compound having at least one ligand having a (substituted) cyclopentadienyl skeleton, an indenyl skeleton or a fluorenyl skeleton, such as bis-cyclopentadienyl titanium dichloride or mono-pentamethylcyclopentadienyl titanium trichloride.

Examples of the reducing organometallic compound include, but are not especially limited to, an organic alkali metal compound such as organic lithium, an organic magnesium compound, an organic aluminum compound, an organic boron compound, and an organic zinc compound.

The hydrogenation reaction will now be described.

A reaction temperature is generally preferably a temperature range of 0° C. to 200° C., and more preferably a temperature range of 30° C. to 150° C.

A pressure of hydrogen used in the hydrogenation reaction is preferably 0.1 MPa to 15 MPa, more preferably 0.2 MPa to 10 MPa, and further preferably 0.3 MPa to 5 MPa.

A hydrogenation reaction time is usually preferably 3 minutes to 10 hours, and more preferably 10 minutes to 5 hours.

The hydrogenation reaction may be performed by any of batch process, continuous process, and a combination of these.

It is preferable that a catalyst residue is removed, if necessary, from a solution of a hydrogenated block copolymer resulting from the hydrogenation reaction, and that the hydrogenated block copolymer is separated from the solution.

Examples of a separation method include, but are not especially limited to, a method in which a polar solvent working as a poor solvent for a hydrogenated modified copolymer, such as acetone or alcohol, is added to a reaction solution after the hydrogenation to precipitate and collect the polymer, a method in which the reaction solution is put in hot water under stirring, and the solvent is removed by steam stripping to collect the polymer, and a method in which the polymer solution is directly heated to remove the solvent.

It is noted that a stabilizer, such as various phenol-based stabilizers, phosphorus-based stabilizers, sulfur-based stabilizers and amine-based stabilizer, may be added to the hydrogenated block copolymer (I) of the present embodiment.

[Hydrogenated Block Copolymer Composition]

The hydrogenated block copolymer composition of the present embodiment contains 0.1 to 95% by mass of the hydrogenated block copolymer (I) described above;
  0.1 to 95% by mass of at least one olefin-based resin (II); and
  0.1 to 99.8% by mass of the hydrogenated block copolymer (III) that is a hydrogenated product of a copolymer containing a vinyl aromatic compound monomer unit and a conjugated diene monomer unit, and that satisfies the following conditions (4) to (10):
  (4) the hydrogenated block copolymer contains a polymer block (A) principally containing a vinyl aromatic monomer unit (hereinafter also referred to simply as the "polymer block (A)") and/or a polymer block (C) principally containing a conjugated diene monomer unit (hereinafter also referred to simply as the "polymer block (C)");
  (5) the hydrogenated block copolymer contains a random copolymer block (B) containing a conjugated diene monomer unit and a vinyl aromatic monomer unit (hereinafter also referred to simply as the "random copolymer block (B)" or "polymer block (B)");
  (6) the hydrogenated block copolymer has a content of all vinyl aromatic monomer units of over 5% by mass and less than 95% by mass;
  (7) the hydrogenated block copolymer has a weight average molecular weight of 30,000 to 1,000,000;
  (8) 75% or more of double bonds in conjugated diene monomer units are hydrogenated;
  (9) the hydrogenated block copolymer has at least one peak of tan δ in a viscoelasticity measurement chart at −25° C. or more and 80° C. or less; and
  (10) the hydrogenated block copolymer has a content of the random copolymer block (B) of over 35% by mass.

[Hydrogenated Block Copolymer (III)]

The hydrogenated block copolymer (III) used in the present embodiment is a hydrogenated block copolymer satisfying the above-described conditions (4) to (10), and different from the hydrogenated block copolymer (I).

(Vinyl Aromatic Compound Monomer Unit)

The vinyl aromatic compound monomer unit contained in the hydrogenated block copolymer is not especially limited, and examples include monomer units derived from styrene, α-methylstyrene, p-methylstyrene, divinylbenzene, 1,1-diphenylethylene, N,N-dimethyl-p-aminoethylstyrene, N,N-diethyl-p-aminoethylstyrene and the like. In particular, from the viewpoint of a balance between cost and mechanical strength, styrene is preferred. One of these monomer units may be singly used, or two or more of these may be used together.

(Conjugated Diene Monomer Unit)

The conjugated diene monomer unit contained in the hydrogenated block copolymer refers to a monomer unit derived from diolefin having a pair of conjugated double bonds. Such diolefin is not especially limited, and examples include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. In particular, from the viewpoint of a balance between good moldability and mechanical strength, 1,3-butadiene and isoprene are preferred.

One of these may be singly used, or two or more of these may be used together.

The content, in the hydrogenated block copolymer (III), of the polymer block (A) principally containing a vinyl aromatic compound monomer unit is preferably 5% by mass or more and 95% by mass or less, more preferably 5% by mass or more and 50% by mass or less, and further preferably 5% by mass or more and 30% by mass or less from the viewpoints of low-temperature elongation, wear resistance, and extrusion moldability of the hydrogenated block copolymer composition.

The content, in the hydrogenated block copolymer (III), of the random copolymer block (B) containing a conjugated diene monomer unit and a vinyl aromatic compound monomer unit is preferably over 35% by mass and 95% by mass or less, more preferably over 35% by mass and 90% by mass or less, and further preferably over 35% by mass and 85% by mass or less from the viewpoints of low-temperature elongation, wear resistance, and extrusion moldability of the hydrogenated block copolymer composition.

The content, in the hydrogenated block copolymer (III), of the polymer block (C) principally containing a conjugated diene monomer unit is preferably 80% by mass or less, more preferably 70% by mass or less, and further preferably 60% by mass from the viewpoints of low-temperature elongation, wear resistance, and extrusion moldability of the hydrogenated block copolymer composition.

In the random copolymer block (B) containing a conjugated diene monomer unit and a vinyl aromatic compound monomer unit, a conjugated diene monomer unit/vinyl aromatic monomer unit (mass ratio) is preferably 75/25 to 10/90, more preferably 70/30 to 13/87, and further preferably 60/40 to 16/84.

The content of all vinyl aromatic compound monomer units in the hydrogenated block copolymer (III) is over 5% by mass and less than 95% by mass. When the content of all vinyl aromatic compound monomer units is over 5% by mass and less than 95% by mass, wear resistance tends to be improved. From a similar viewpoint, the content of all vinyl aromatic compound monomer units in the hydrogenated block copolymer (III) is preferably 5% by mass or more and 95% by mass or less, more preferably 10% by mass or more and 90% by mass or less, and further preferably 15% by mass or more and 85% by mass or less.

<Weight Average Molecular Weight of Hydrogenated Block Copolymer (III)>

The weight average molecular weight of the hydrogenated block copolymer (III) used in the present embodiment is 30,000 to 1,000,000, preferably 50,000 to 800,000, and more preferably 80,000 to 600,000 from the viewpoint of obtaining a good balance among heat resistance, mechanical strength, and flowability (moldability) in the hydrogenated block copolymer composition to be finally obtained.

It is noted that the weight average molecular weight of the hydrogenated block copolymer (III) is obtained, in the present embodiment, through measurement by gel permeation chromatography (GPC) using a calibration curve obtained by measurement of commercially available standard polystyrene (created by using a peak molecular weight of the standard polystyrene).

<Molecular Weight Distribution of Hydrogenated Block Copolymer (III)>

A molecular weight distribution of the hydrogenated block copolymer (III) can be obtained through measurement by GPC, and calculated based on a ratio between the weight average molecular weight and a number average molecular weight.

The molecular weight distribution of the hydrogenated block copolymer (III) is preferably 10 or less, more preferably 8 or less, and further preferably 5 or less.

<Hydrogenation Rate of Double Bonds of Conjugated Diene Monomer Unit in Hydrogenated Block Copolymer (III)>

A hydrogenation rate of double bonds in the conjugated diene monomer unit in the hydrogenated block copolymer (III) is 75% or more, preferably 80% or more, and more preferably 85% or more from the viewpoint of obtaining good heat resistance and weather resistance in the hydrogenated block copolymer composition to be finally obtained.

<Hydrogenation Rate of Aromatic Double Bond of Vinyl Aromatic Compound Unit in Hydrogenated Block Copolymer (III)>

A hydrogenation rate of an aromatic double bond in the vinyl aromatic compound unit in the hydrogenated block copolymer (III) is not especially limited, and is preferably 50% or less, more preferably 30% or less, and further preferably 20% or less.

Here, the hydrogenation rate of the hydrogenated block copolymer (III) can be measured with a nuclear magnetic resonance apparatus (NMR) or the like.

<Crystallization Peak of Hydrogenated Block Copolymer (III)>

As described above, the hydrogenated block copolymer (III) has at least one peak of loss tangent (tan δ) in the viscoelasticity measurement chart in the range of −25° C. or more and 80° C. or less. The peak of loss tangent (tan δ) present in the above-described range is a peak derived from the random copolymer block (B) (hydrogenated copolymer block obtained by hydrogenating a non-hydrogenated random copolymer block containing a conjugated diene monomer unit and a vinyl aromatic compound monomer unit). A peak of loss tangent (tan δ) may be present or may not be present in a region out of the range. For example, the hydrogenated block copolymer (III) may contain a polymer block having a peak of loss tangent (tan δ) in a region out of the range. Such a polymer block is not especially limited, and examples include a hydrogenated copolymer block obtained by hydrogenating a non-hydrogenated copolymer block containing a conjugated diene monomer unit and a vinyl aromatic monomer unit (and containing the conjugated diene monomer unit in an amount of 45% by mass or more), and a hydrogenated polymer block obtained by hydrogenating a non-hydrogenated polymer block containing a conjugated diene monomer unit having a vinyl bond content of 30% or more. When, however, the hydrogenated block copolymer (III) contains such a polymer block, it is recommended that there is substantially no crystallization peak in a range of −25 to 80° C., and preferably of −50 to 100° C. in a differential scanning calorimetry (DSC) chart obtained from the hydrogenated block copolymer (III).

<Structure of Hydrogenated Block Copolymer (III)>

The structure of the hydrogenated block copolymer (III) is not especially limited, and any structure can be employed. In one aspect, the hydrogenated block copolymer (III) can be a hydrogenated block copolymer containing at least one polymer block (C), at least one random copolymer block (B), and in some cases, at least one polymer block (A), and such a hydrogenated block copolymer (III) is not especially limited, and examples include those having structures represented by the following formulas:

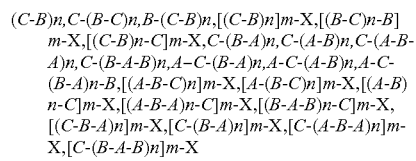

In another aspect, although not especially limited, the hydrogenated block copolymer (III) can be a hydrogenated copolymer containing at least two polymer blocks (A), and at least one random copolymer block (B), and such a hydrogenated block copolymer (III) is not especially limited, and examples include those having structures represented by the following formulas:

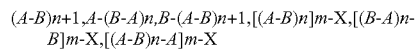

In the above-described formulas, each A independently represents the polymer block (A) principally containing a vinyl aromatic monomer unit. Each B independently represents the random copolymer block (B) containing a conjugated diene monomer unit and a vinyl aromatic monomer unit (hydrogenated copolymer block obtained by hydrogenating a non-hydrogenated random copolymer containing a conjugated diene monomer unit and a vinyl aromatic monomer unit). Each C independently represents the polymer block (C) principally containing a conjugated diene monomer unit (for example, hydrogenated polymer block obtained by hydrogenating a non-hydrogenated polymer block containing a conjugated diene monomer unit and having a vinyl bond content less than 30%). A boundary between the blocks need not be clearly distinguished. The vinyl aromatic monomer unit may have a uniform distribution or a tapered distribution in the random copolymer block (B).

In the random copolymer block (B), there may be a plurality of portions each having a uniform distribution and/or tapered distribution of the vinyl aromatic monomer unit. Besides, in the random copolymer block (B), there may be a plurality of segments respectively having different contents of the vinyl aromatic monomer unit. Each n independently represents an integer of 1 or more, and preferably an integer of 1 to 5. Each m independently represents an integer of 2 or more, and preferably an integer of 2 to 11. Each X independently represents a residue of a coupling agent or a residue of a multifunctional initiator. As the coupling agent, a bi- or higher functional coupling agent described below can be used. As the multifunctional initiator, a reaction product between diisopropenylbenzene and sec-butyllithium, a reaction product among divinylbenzene, sec-butyllithium and a small amount of 1,3-butadiene, or the like can be used.

The hydrogenated block copolymer (III) may be an arbitrary mixture of those having the structures represented by the above-described formulas. Alternatively, the hydrogenated copolymer may be a mixture of a hydrogenated block copolymer having any of the structures represented by the above-described formulas, and at least one polymer selected from the group consisting a polymer principally containing a vinyl aromatic monomer unit, a copolymer having an A-B structure, and a copolymer having a B-A-B structure.

The distribution of the vinyl aromatic compound monomer unit in the hydrogenated block copolymer (III) is not especially limited as long as the range of the content of all vinyl aromatic compound monomer units of the condition (6) is satisfied, and the distribution may be a uniform distribution, or a tapered, stepwise, convex or concave distribution. There may coexist a plurality of distribution forms of the vinyl aromatic compound monomer unit. Furthermore, there may coexist a plurality of segments having different contents of the vinyl aromatic compound monomer unit in the hydrogenated block copolymer (III).

In the hydrogenated block copolymer (III), a distribution of a vinyl bond unit in each of the blocks (A) and (B) is not especially limited, and there may be a distribution. The distribution of a vinyl bond can be controlled by adding a modifier described below during polymerization, or changing the temperature during the polymerization.

There may be a distribution of the hydrogenation rate of the conjugated diene monomer unit in the hydrogenated block copolymer (III). The distribution of the hydrogenation rate can be controlled by changing the distribution of a vinyl bond unit, or by a method, for example, in which isoprene and butadiene are copolymerized with each other, and the resultant is hydrogenated with a hydrogenation catalyst described below to utilize a difference in the hydrogenation speed between an isoprene unit and a butadiene unit.

Other Examples of Structure of Hydrogenated Block Copolymer (III)

The above-described hydrogenated block copolymer (III) may be a modified block copolymer in which atomic groups each having a prescribed functional group are bonded to one another.

The modified block copolymer may be a secondary modified block copolymer.
<Production Method for Hydrogenated Block Copolymer (III)>

As a production method for the hydrogenated block copolymer (III), the above-described production method for the hydrogenated block copolymer (I) can be applied. In particular, when an operation of adjusting the content of the random copolymer block is performed, the hydrogenated block copolymer (III) satisfying the conditions (4) to (9) can be obtained.
<Olefin-Based Resin (II)>

The olefin-based resin (II) contained in the hydrogenated block copolymer composition of the present embodiment will now be described.

Examples of the olefin-based resin (II) include, but are not especially limited to, homopolymers of α-olefins such as polyethylene (PE), polypropylene (PP), 1-butene, 1-pentene, 1-hexene, 3-methyl-1-butene, 4-methyl-1-pentene, and 1-octene. Other examples include a random copolymer or a block copolymer containing a combination of olefins selected from the group consisting of ethylene, propylene, butene, pentene, hexene and octene.

Specific examples include, but are not especially limited to, ethylene and/or propylene-α-olefin copolymers such as an ethylene-propylene copolymer, an ethylene-1-butene copolymer, an ethylene-3-methyl-1-butene copolymer, an ethylene-4-methyl-1-pentene copolymer, an ethylene-1-hexene copolymer, an ethylene-1-octene copolymer, an ethylene-1-decene copolymer, a propylene-1-butene copolymer, a propylene-1-hexene copolymer, a propylene-1-octene copolymer, a propylene-4-methyl-1-pentene copolymer, an ethylene-propylene-1-butene copolymer, a propylene-1-hexene-ethylene copolymer, and a propylene-1-octene-ethylene copolymer.

A copolymer of ethylene and/or propylene embraces the following copolymers with another unsaturated monomer.

Although not especially limited, specific examples include copolymers of ethylene and/or propylene with unsaturated organic acids or derivatives thereof, such as acrylic acid, methacrylic acid, maleic acid, itaconic acid, methyl acrylate, methyl methacrylate, maleic anhydride, aryl maleimide, and alkyl maleimide; copolymers of ethylene and/or propylene with vinyl esters such as vinyl acetate; and copolymers of ethylene and/or propylene with non-conjugated dienes such as dicyclopentadiene, 4-ethylidene-2-norbornene, 4-methyl-1,4-hexadiene, and 5-methyl-1,4-hexadiene.

The olefin-based resin (II) preferably contains at least one polypropylene-based resin.

The olefin-based resin (II) may be modified with a prescribed functional group.

Although not especially limited, examples of the functional group include an epoxy group, a carboxy group, an acid anhydride, and a hydroxy group.

A functional group-containing compound or a denaturant to be used for modifying the olefin-based resin (II) is not especially limited, and examples include the following compounds:

Unsaturated epoxides such as glycidyl methacrylate, glycidyl acrylate, vinyl glycidyl ether, and allyl glycidyl ether; and unsaturated organic acids such as maleic acid, fumaric acid, itaconic acid, citraconic acid, allyl succinic acid, maleic anhydride, fumaric anhydride, and itaconic anhydride.

Other examples include, but are not especially limited to, an ionomer and chlorinated polyolefin.

From the viewpoints of obtaining economic efficiency and good compatibility in the hydrogenated block copolymer composition of the present embodiment to attain high transparency, the olefin-based resin (II) is preferably a polypropylene-based resin such as a polypropylene homopolymer or an ethylene-propylene random or block copolymer.

In particular, from the viewpoint of transparency and flexibility, an ethylene-propylene random copolymer is more preferred.

The olefin-based resin (II) may contain a single material, or may contain two or more materials.

The hydrogenated block copolymer composition of the present embodiment embraces one according to a first embodiment containing the hydrogenated block copolymer (I) and at least one olefin-based resin (II), and one according to a second embodiment, as described above, containing the hydrogenated block copolymer (I), at least one olefin-based resin (II), and the hydrogenated block copolymer (III).

In the hydrogenated block copolymer composition of the first embodiment, the content of the hydrogenated block copolymer (I) is preferably 0.1% by mass to 95% by mass, more preferably 0.5% by mass to 70% by mass, and further preferably 1% by mass to 50% by mass.

When the content of the hydrogenated block copolymer (I) is 1% by mass or more, low-temperature elongation and wear resistance of the hydrogenated block copolymer composition tend to be improved. On the other hand, when the content of the hydrogenated block copolymer (I) is 95% by mass or less, wear resistance of the hydrogenated block copolymer composition tends to be improved.

In the hydrogenated block copolymer composition of the second embodiment, the content of the hydrogenated block copolymer (I) is 0.1% by mass to 95% by mass, preferably 1% by mass to 60% by mass, and more preferably 3% by mass to 40% by mass, the content of the hydrogenated block copolymer (III) is 0.1% by mass to 99.8% by mass, preferably 5% by mass to 90% by mass, and more preferably 10% by mass to 80% by mass, and the content of the olefin-based resin (II) is 0.1% by mass to 95% by mass, preferably 5% by mass to 90% by mass, and more preferably 10% by mass to 80% by mass.

When the contents of the hydrogenated block copolymers (I) and (III) and the olefin-based resin (II) respectively fall in the above-described ranges, wear resistance, low-temperature elongation, and extrusion moldability of the hydrogenated block copolymer composition tend to be improved.

In the hydrogenated block copolymer composition of the present embodiment, an arbitrary rubber softener, a modifying agent, an additive and the like may be added in addition to the above-described hydrogenated block copolymers (I) and (III) and the polyolefin-based resin (II).

The rubber softener softens a target hydrogenated block copolymer composition, and imparts flowability (moldability) thereto. The rubber softener may be, but is not especially limited to, for example, a mineral oil or a liquid or low molecular weight synthetic softener, and in particular, naphthene-based and/or paraffin-based process oils or extender oils are suitably used.

A mineral oil-based rubber softener is a mixture of an aromatic ring, a naphthene ring, and a paraffin ring, and a softener containing a paraffin ring having a carbon number corresponding to 50% or more of all carbons is designated as a paraffin-based softener, a softener containing a naphthene ring having a carbon number corresponding to 30 to 45% is designated as a naphthene-based softener, and a softener containing an aromatic ring having a carbon number over 30% is designated as an aromatic-based softener.

As a synthetic softener, for example, polybutene, low molecular weight polybutadiene, liquid paraffin and the like can be used, but the above-described mineral oil-based rubber softener is more preferred.

When the target hydrogenated block copolymer composition is required of high heat resistance and mechanical properties, a mineral oil-based rubber softener to be used therein preferably has a kinematic viscosity at 40° C. of 60 cst or more, and preferably 120 cst or more. One of rubber softeners may be singly used, or two or more of these may be used together.

The modifying agent has a function to improve scratch resistance on the surface of the target hydrogenated block copolymer composition, or improve adhesiveness. The modifying agent is not especially limited, and for example, organic polysiloxane can be applied. It exhibits a surface modification effect for the hydrogenated block copolymer composition, and functions as a wear resistance improving agent.

The modifying agent may be in any of a liquid form having a low viscosity, a liquid form having a high viscosity, and a solid form, and from the viewpoint of attaining good dispersibility in the hydrogenated block copolymer composition, is suitably in a liquid form, namely, a silicone oil is suitably used. The kinematic viscosity is preferably 90 cst or more, and more preferably 1,000 cst or more from the viewpoint of inhibiting bleed of polysiloxane itself. Specific examples of the polysiloxane include, but are not especially limited to, general-purpose silicone oils such as dimethyl polysiloxane and methylphenyl polysiloxane, and various modified silicone oils such as alkyl-modified, polyether-modified, fluorine-modified, alcohol-modified, amino-modified, and epoxy-modified silicone oils. Although not especially limited, dimethyl polysiloxane is suitably used because it is highly effective as a wear resistance improving agent. One of such organic polysiloxanes may be singly used, or two or more of these may be used together.

The additive is not especially limited, and can be a filler, a lubricant, a releasing agent, a plasticizer, an antioxidant, a heat stabilizer, a light stabilizer, a UV absorber, a flame retardant, an antistatic agent, a reinforcing agent, and a colorant that are generally used in a thermoplastic resin and a rubbery polymer.

Examples of the filler include, but are not especially limited to, inorganic fillers such as silica, talc, mica, calcium silicate, hydrotalcite, kaolin, diatomite, graphite, calcium carbonate, magnesium carbonate, magnesium hydroxide, aluminum hydroxide, calcium sulfate, and barium sulfate, and organic fillers such as carbon black.

Examples of the lubricant include, but are not especially limited to, stearic acid, behenic acid, zinc stearate, calcium stearate, magnesium stearate, and ethylene-bis-stearamide.

Examples of the plasticizer include, but are not especially limited to, organic polysiloxane and mineral oil.

An example of the antioxidant includes, but is not especially limited to, a hindered phenol-based antioxidant.

Examples of the heat stabilizer include, but are not especially limited to, phosphorus-based, sulfur-based and amine-based heat stabilizers.

An example of the light stabilizer includes, but is not especially limited to, a hindered amine-based light stabilizer.

An example of the UV absorber includes, but is not especially limited to, a benzotriazole-based UV absorber.

Examples of the reinforcing agent include, but are not especially limited to, organic fiber, glass fiber, carbon fiber, and metal whisker.

Examples of the colorant include, but are not especially limited to, titanium oxide, iron oxide, and carbon black.

The other examples include those described in, for example, "Gomu/Plastic Haigo Yakuhin (Rubber/Plastic Compounding Chemicals)" (edited by Rubber Digest Co., Ltd.).

The hydrogenated block copolymer composition of the present embodiment can be produced by a conventionally known method.

Although not especially limited, examples include a method in which respective components (the hydrogenated block copolymers (I) and (III), the polyolefin-based resin (II), and other additives) are melt kneaded using a mixer, such as a Bunbury mixer, a single screw extruder, a twin screw extruder, a Ko Kneader, or a multi-screw extruder; and a method in which the respective components are dissolved or dispersed to be mixed, followed by removal of a solvent by heating. In particular, a melt kneading method using an extruder is suitably employed from the viewpoints of productivity and good kneadability.

The shape of the hydrogenated block copolymer composition is not especially limited, and can be in any arbitrary shape such as a pellet shape, a sheet shape, a strand shape, or a chip shape. After the melt kneading, a molded article may be directly produced.

[Molded Article Using Hydrogenated Block Copolymer Composition]

A molded article of the present embodiment is a molded article made of the hydrogenated block copolymer composition described above.

The above-described hydrogenated block copolymer composition can be made into a practically useful molded article through a method not especially limited, such as extrusion molding, injection molding, two-color injection molding, sandwich molding, blow molding, compression molding, vacuum molding, rotational molding, powder slush molding, foam molding, laminate molding, or calendar molding.

The molded article of the present embodiment is not especially limited, and examples include an injection molded article, a blow molded article, a compression molded article, a vacuum molded article, an extrusion molded article, and a foam molded article in various shapes such as a sheet or a film, a molded article in the shape of nonwoven fabric or fiber, and other various molded articles including synthetic leather.

These molded articles can be used for, for example, a vehicle component, a food packaging material, a medical instrument, a member of home appliances, an electronic device member, a building material, an industrial component, a household article, a toy material, a footwear material, a fiber material and the like.

Specific examples of the vehicle component, which are not especially limited, include a side mall, a grommet, a shift knob, a weather strip, a window frame and its sealing material, an arm rest, an assist grip, a door grip, a steering wheel grip, a console box, a head rest, an instrument panel, a bumper, a spoiler, and an air bag cover.

Examples of the medical instrument include, but are not especially limited to, a medical tube, a medical hose, a catheter, a blood bag, an infusion bag, a platelet storage bag, and a dialysis bag.

Examples of the building material include, but are not especially limited to, a wall material and a floor material.

The other examples include, but are not especially limited to, an industrial hose, a hose for food, a hose for a vacuum cleaner, an electrically cooling gasket, various coating materials for an electrical wire and the like, a coating material for a grip, and a soft doll.

The molded article of the present embodiment may be appropriately processed by foaming, powdering, extending, adhering, printing, coating, plating or the like.

The hydrogenated block copolymer composition of the present embodiment exhibits excellent effects in flexibility, low rebound resilience, transparency, and kink resistance, and hence is very useful as a hollow composition such as a hose or a tube.

EXAMPLES

Now, the present invention will be described more specifically with reference to examples and comparative examples, and it is noted that the present invention is not limited to the following examples.

<Method for Specifying Structure of Copolymer, and Method for Measuring Physical Properties>

(1) Content of All Vinyl Aromatic (Styrene) Monomer Units in Hydrogenated Block Copolymer (I) and (III)

A block copolymer before hydrogenation was used to measure a content of all vinyl aromatic (styrene) monomer units by using a UV spectrophotometer (UV-2450, manufactured by Shimadzu Corporation).

(2) Contents of Polymer Block (Polystyrene Block) Principally Containing Vinyl Aromatic Compound Monomer Unit in Hydrogenated Block Copolymers (I) and (III)

A block copolymer before hydrogenation was used to measure a content of a polymer block (polystyrene block) principally containing a vinyl aromatic compound monomer unit by the osmium tetroxide method described in I. M. Kolthoff, et al., J. Polym. Sci. 1, 429 (1946).

For decomposition of the block copolymer, a solution of 0.1 g of osmium acid in 125 mL tertiary butanol was used.

(3) Vinyl Bond Contents in Hydrogenated Block Copolymers (I) and (III)

A block copolymer before hydrogenation was used for measurement with an infrared spectrophotometer (FT/IR-4100, manufactured by JASCO Corporation). A vinyl bond content in the copolymer was calculated by a Hampton Method.

(4) Molecular Weights and Molecular Weight Distributions of Hydrogenated Block Copolymers (I) and (III)

A weight average molecular weight of the hydrogenated block copolymer (I) was measured by GPC [apparatus: HLC-8220PC (manufactured by Tosoh Corporation), column: TSKgel guard column Super HZ-L (4.6 mm×20 cm)× 3].

Tetrahydrofuran was used as a solvent. The measurement was performed at a temperature of 35° C.

The molecular weight is a weight average molecular weight corresponding to a molecular weight at a peak of a chromatogram obtained by using a calibration curve obtained by measurement of commercially available standard polystyrene (created by using a peak molecular weight of the standard polystyrene).

When there were a plurality of peaks in the chromatogram, the molecular weight is an average molecular weight obtained based on molecular weights at the respective peaks and composition ratios corresponding to the respective peaks (obtained from an area ratio among the peaks in the chromatogram).

The molecular weight distribution is a ratio (Mw/Mn) between the thus obtained weight average molecular weight (Mw) and a number average molecular weight (Mn).

(5) Hydrogenation Rates of Hydrogenated Block Copolymers (I) and (III), and Hydrogenation Rates of Double Bonds of Conjugated Diene Monomer Units in Hydrogenated Block Copolymers (I) and (III)

Modified copolymers after hydrogenation were used to measure the hydrogenation rates of the hydrogenated block copolymers (I) and (III), and the hydrogenation rates of double bonds of the conjugated diene monomer units with a nuclear magnetic resonance apparatus (ECS400, manufactured by JEOL RESONANCE Inc.).

(6) Content of Vinyl Aromatic Compound Monomer Unit Adjacent to Conjugated Diene Monomer Unit in Block Copolymer A block copolymer before hydrogenation was used to measure the content of a vinyl aromatic compound monomer unit adjacent to a conjugated diene monomer unit in the block copolymer with a nuclear magnetic resonance apparatus (ECS400, manufactured by JEOL RESONANCE Inc.)

by the method described in Y. Tanaka et al., RUBBER CHEMISTRY and TECHNOLOGY 54, 685 (1981).

(7) Structure and Content of Each Polymer Block at One End of Hydrogenated Block Copolymer (I)

A content of each polymer block at one end of the hydrogenated block copolymer (I) was measured by using the block copolymer before hydrogenation with a nuclear magnetic resonance apparatus (ECS400, manufactured by JEOL RESONANCE Inc.) by the method described in Y. Tanaka et al., RUBBER CHEMISTRY and TECHNOLOGY 54, 685 (1981).

(8) Tan δ Peak Temperature

First, a sample was cut into a size with a width of 12.5 mm and a length of 40 mm to obtain a measurement sample.

Next, the measurement sample was set in an apparatus ARES (trade name, manufactured by TA Instruments) to have a twisted geometry, and measurement was performed under conditions of an effective measurement length of 25 mm, a strain of 0.5%, a frequency of 1 Hz, and a temperature increasing rate of 3° C./min.

The tan δ peak temperature was defined as a value obtained based on a peak detected by automatic measurement with RSI Orchestrator (trade name, manufactured by TA Instruments).

(9) Hardness

In accordance with JIS K6253, a value after 10 seconds was measured using a durometer type A.

A value of the hardness is preferably 96 or less.

(10) Tensile Strength (Tb), Elongation at Break (Eb), and Low-Temperature Elongation (Elongation at Break at −30° C.; Tbc)

Tensile strength (Tb), elongation at break (Eb), and low-temperature elongation (elongation at break at −30° C., Tbc) were measured in accordance with JIS K6251 with No. 3 dumbbell at a crosshead speed of 500 mm/min.

(11) Abrasion Resistance

A color fastness rubbing tester (AB-301, manufactured by Tester Sangyo Co., Ltd.) was used to rub a surface (leather-textured surface) of a molded sheet with a rubbing cloth Kanakin No. 3 under a load of 500 g, and the wear resistance was evaluated in accordance with a volume decrease caused by the rubbing based on the following criteria:

◎: A volume decrease caused by 10,000 times of rubbing was 0.01 ml or less.

○: A volume decrease caused by 10,000 times of rubbing was over 0.01 ml and 0.1 ml or less.

Δ: A volume decrease caused by 10,000 times of rubbing was over 0.1 ml and 0.2 ml or less.

X: A volume decrease caused by 10,000 times of rubbing was over 0.2 ml.

(12) Easiness of Pulling Strand (Extrusion Moldability)

Easiness of pulling a strand extruded through a die nozzle of a single screw extruder TEX-30, manufacture by, was visually evaluated on a scale of 1 to 3.

A strand that could be pulled at a high speed was evaluated as "3", a strand that was easily broken when pulled at a high speed but was not broken when pulled at a low speed was evaluated as "2", and a strand that was easily broken even when pulled at a low speed was evaluated as "1".

A higher score on the scale of 1 to 3 corresponds to more excellent extrudability.

<Preparation of Hydrogenation Catalyst>

A hydrogenation catalyst to be used in producing a hydrogenated block copolymer in an example and a comparative example described later was prepared as follows.

A reaction vessel equipped with a stirrer having been replaced with nitrogen was charged with 1 liter of dried and purified cyclohexane.

Next, 100 mmol of bis(η5-cyclopentadienyl)titanium dichloride was added thereto.

A n-hexane solution containing 200 mmol of trimethyl aluminum was added to the resultant under sufficient stirring, followed by a reaction at room temperature for about 3 days. Thus, a hydrogenation catalyst was obtained.

<Hydrogenated Block Copolymer>

Hydrogenated block copolymers (I)-1 to (I)-22, (I)-A to (I)-J and (III)-1 to (III)-3 to be contained in a hydrogenated block copolymer composition were prepared as follows.

Production Example 1

(Hydrogenated Block Copolymer (I)-1)

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 75% by mass), a weight average molecular weight of 200,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-1.

The hydrogenated block copolymer (I)-1 thus obtained had a hydrogenation rate of 98%. The other characteristics thereof are shown in Table 1.

Production Example 2

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.0 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 62% by mass (a vinyl bond content in a conjugated diene polymer block of 65% by mass), a weight average molecular weight of 202,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-2.

The hydrogenated block copolymer (I)-2 thus obtained had a hydrogenation rate of 97%. The other characteristics thereof are shown in Table 1.

Production Example 3

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 0.6 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 51% by mass (a vinyl bond content in a conjugated diene polymer block of 55% by mass), a weight average molecular weight of 204,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-3.

The hydrogenated block copolymer (I)-3 thus obtained had a hydrogenation rate of 96%. The other characteristics thereof are shown in Table 1.

Production Example 4

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 84.5 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 1.5 parts by mass of styrene and 1 part by mass of butadiene was charged, followed by polymerization at 60° C. for 1 hour. Thereafter, methanol was added thereto to stop the polymerization reaction.

A block copolymer obtained in this manner had a styrene content of 14.5% by mass, a polystyrene block content of 13% by mass, a vinyl bond content of 74% by mass (a vinyl bond content in a conjugated diene polymer block of 75% by mass), a weight average molecular weight of 201,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-4.

The hydrogenated block copolymer (I)-4 thus obtained had a hydrogenation rate of 96%. The other characteristics thereof are shown in Table 1.

Production Example 5

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 74 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 8 parts by mass of styrene and 5 parts by mass of butadiene was charged, followed by polymerization at 60° C. for 1 hour. Thereafter, methanol was added thereto to stop the polymerization reaction.

A block copolymer obtained in this manner had a styrene content of 21% by mass, a polystyrene block content of 13% by mass, a vinyl bond content of 70% by mass (a vinyl bond content in a conjugated diene polymer block of 75% by mass), a weight average molecular weight of 201,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-5.

The hydrogenated block copolymer (I)-5 thus obtained had a hydrogenation rate of 96%. The other characteristics thereof are shown in Table 1.

Production Example 6

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 63 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 15 parts by mass of styrene and 9 parts by mass of butadiene was charged, followed by polymerization at 60° C. for 1 hour. Thereafter, methanol was added thereto to stop the polymerization reaction.

A block copolymer obtained in this manner had a styrene content of 28% by mass, a polystyrene block content of 13% by mass, a vinyl bond content of 62% by mass (a vinyl bond content in a conjugated diene polymer block of 75% by mass), a weight average molecular weight of 203,000, and a molecular weight distribution of 1.03.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-6.

The hydrogenated block copolymer (I)-6 thus obtained had a hydrogenation rate of 96%. The other characteristics thereof are shown in Table 1.

Production Example 7

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.040 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 75% by mass), a weight average molecular weight of 401,000, and a molecular weight distribution of 1.05.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-7.

The hydrogenated block copolymer (I)-7 thus obtained had a hydrogenation rate of 95%. The other characteristics thereof are shown in Table 1.

Production Example 8

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.16 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 75% by mass), a weight average molecular weight of 101,000, and a molecular weight distribution of 1.03.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-8.

The hydrogenated block copolymer (I)-8 thus obtained had a hydrogenation rate of 96%. The other characteristics thereof are shown in Table 1.

Production Example 9

A tank reactor (having a capacity of 10 L) equipped with a stirrer and a jacket was used for performing batch polymerization.

First, a cyclohexane solution (concentration of 20% by mass) containing 10.5 parts by mass of styrene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 71 parts by mass of butadiene was added thereto, followed by polymerization at 60° C. for 2 hours. Next, a cyclohexane solution (concentration of 20% by mass) containing 10.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 26% by mass, a polystyrene block content of 21% by mass, a vinyl bond content of 70% by mass (a vinyl bond content in a conjugated diene polymer block of 75% by mass), a weight average molecular weight of 201,000, and a molecular weight distribution of 1.03.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-9.

The hydrogenated block copolymer (I)-9 thus obtained had a hydrogenation rate of 97%. The other characteristics thereof are shown in Table 1.

Production Example 10

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 21% by mass, a polystyrene block content of 13% by mass, a vinyl bond content of 73% by mass (a vinyl bond content in a conjugated diene polymer block of 75% by mass), a weight average molecular weight of 201,000, and a molecular weight distribution of 1.03.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-10.

The hydrogenated block copolymer (I)-10 thus obtained had a hydrogenation rate of 80%. The other characteristics thereof are shown in Table 1.

Production Example 11

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 75% by mass), a weight average molecular weight of 201,000, and a molecular weight distribution of 1.03.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-11.

The hydrogenated block copolymer (I)-11 thus obtained had a hydrogenation rate of 60%. The other characteristics thereof are shown in Table 2.

Production Example 12

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 2.5 parts by mass of styrene and 5.5 parts by mass of butadiene was charged, followed by polymerization at 60° C. for 1 hour. Thereafter, methanol was added thereto to stop the polymerization reaction.

A block copolymer obtained in this manner had a styrene content of 15.5% by mass, a polystyrene block content of 13% by mass, a vinyl bond content of 74% by mass (a vinyl bond content in a conjugated diene polymer block of 75% by mass), a weight average molecular weight of 202,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-12.

The hydrogenated block copolymer (I)-12 thus obtained had a hydrogenation rate of 95%. The other characteristics thereof are shown in Table 2.

Production Example 13

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 6 parts by mass of styrene and 2 parts by mass of butadiene was charged, followed by polymerization at 60° C. for 1 hour. Thereafter, methanol was added thereto to stop the polymerization reaction.

A block copolymer obtained in this manner had a styrene content of 19% by mass, a polystyrene block content of 13% by mass, a vinyl bond content of 70% by mass (a vinyl bond content in a conjugated diene polymer block of 75% by mass), a weight average molecular weight of 204,000, and a molecular weight distribution of 1.03.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-13.

The hydrogenated block copolymer (I)-13 thus obtained had a hydrogenation rate of 94%. The other characteristics thereof are shown in Table 2.

Production Example 14

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 7 parts by mass of styrene and 1 part by mass of butadiene was charged, followed by polymerization at 60° C. for 1 hour. Thereafter, methanol was added thereto to stop the polymerization reaction.

A block copolymer obtained in this manner had a styrene content of 20% by mass, a polystyrene block content of 13% by mass, a vinyl bond content of 68% by mass (a vinyl bond content in a conjugated diene polymer block of 75% by mass), a weight average molecular weight of 202,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-14.

The hydrogenated block copolymer (I)-14 thus obtained had a hydrogenation rate of 96%. The other characteristics thereof are shown in Table 2.

Production Example 15

A tank reactor (having a capacity of 10 L) equipped with a stirrer and a jacket was used for performing batch polymerization.

First, a cyclohexane solution (concentration of 20% by mass) containing 2.5 parts by mass of styrene and 1.5 parts by mass of butadiene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 6.5 parts by mass of styrene was added thereto, followed by polymerization at 70° C. for 2 hours. Next, a cyclohexane solution (concentration of 20% by mass) containing 76 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 2.5 parts by mass of styrene and 1.5 parts by mass of butadiene was charged, followed by polymerization at 60° C. for 1 hour. Thereafter, methanol was added thereto to stop the polymerization reaction.

A block copolymer obtained in this manner had a styrene content of 28% by mass, a polystyrene block content of 13% by mass, a vinyl bond content of 73% by mass (a vinyl bond content in a conjugated diene polymer block of 75% by mass), a weight average molecular weight of 202,000, and a molecular weight distribution of 1.05.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-15.

The hydrogenated block copolymer (I)-15 thus obtained had a hydrogenation rate of 94%. The other characteristics thereof are shown in Table 2.

Production Example 16

A tank reactor (having a capacity of 10 L) equipped with a stirrer and a jacket was used for performing batch polymerization.

First, a cyclohexane solution (concentration of 20% by mass) containing 5 parts by mass of styrene and 3 parts by mass of butadiene was charged.

Next, n-butyllithium was added in a ratio of 0.16 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 13 parts by mass of styrene was added thereto, followed by polymerization at 70° C. for 2 hours. Next, a cyclohexane solution (concentration of 20% by mass) containing 76 parts by mass of butadiene was added thereto, followed by polymerization at 60° C. for 20 minutes. Next, ethyl benzoate was added in a ratio of 0.4 moles per mole of n-butyllithium, followed by a reaction at 70° C. for 10 minutes. Thereafter, methanol was added thereto to stop the polymerization reaction.

A block copolymer obtained in this manner had a styrene content of 28% by mass, a polystyrene block content of 13% by mass, a vinyl bond content of 73% by mass (a vinyl bond content in a conjugated diene polymer block of 75% by mass), a weight average molecular weight of 197,000, and a molecular weight distribution of 1.12. Besides, a coupling ratio obtained based on a peak area ratio on a GPC curve was 80%.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-16.

The hydrogenated block copolymer (I)-16 thus obtained had a hydrogenation rate of 94%. The other characteristics thereof are shown in Table 2.

Production Example 17

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 76 parts by mass of butadiene was added thereto, followed by polymerization at 60° C. for 2 hours. Next, a cyclohexane solution (concentration of 20% by mass) containing 10.5 parts by mass of styrene and 7 parts by mass of butadiene was charged, followed by polymerization at 60° C. for 1 hour. Thereafter, methanol was added thereto to stop the polymerization reaction.

A block copolymer obtained in this manner had a styrene content of 17% by mass, a polystyrene block content of 6.5% by mass, a vinyl bond content of 73% by mass (a vinyl bond content in a conjugated diene polymer block of 75% by mass), a weight average molecular weight of 201,000, and a molecular weight distribution of 1.02.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-17.

The hydrogenated block copolymer (I)-17 thus obtained had a hydrogenation rate of 96%. The other characteristics thereof are shown in Table 2.

Production Example 18

A tank reactor (having a capacity of 10 L) equipped with a stirrer and a jacket was used for performing batch polymerization.

First, a cyclohexane solution (concentration of 20% by mass) containing 10.5 parts by mass of styrene and 7 parts by mass of butadiene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 6.5 parts by mass of styrene was added thereto, followed by polymerization at 60° C. for 2 hours. Next, a cyclohexane solution (concentration of 20% by mass) containing 76 parts by mass of butadiene was charged, followed by polymerization at 60° C. for 1 hour. Thereafter, methanol was added thereto to stop the polymerization reaction.

A block copolymer obtained in this manner had a styrene content of 17% by mass, a polystyrene block content of 6.5% by mass, a vinyl bond content of 73% by mass (a vinyl bond content in a conjugated diene polymer block of 75% by mass), a weight average molecular weight of 202,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-18.

The hydrogenated block copolymer (I)-18 thus obtained had a hydrogenation rate of 95%. The other characteristics thereof are shown in Table 2.

Production Example 19

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 70 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Next, a cyclohexane solution (concentration of 20% by mass) containing 9 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 74% by mass), a weight average molecular weight of 202,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-19.

The hydrogenated block copolymer (I)-19 thus obtained had a hydrogenation rate of 95%. Besides, one end of the hydrogenated block copolymer (I)-19 had a structure of the following formula (ii). The other characteristics thereof are shown in Table 2.

$$(c\text{-}b)\text{-} \quad (ii)$$

wherein b represents the hydrogenated copolymer block (b) containing a vinyl aromatic compound monomer unit and a conjugated diene monomer unit, and c represents the hydrogenated polymer block (c) principally containing a conjugated diene monomer unit.

Production Example 20

A tank reactor (having a capacity of 10 L) equipped with a stirrer and a jacket was used for performing batch polymerization.

First, a cyclohexane solution (concentration of 20% by mass) containing 5.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 5.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Then, a cyclohexane solution (concentration of 20% by mass) containing 2 parts by mass of styrene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 75% by mass), a weight average molecular weight of 202,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-20.

The hydrogenated block copolymer (I)-20 thus obtained had a hydrogenation rate of 95%. Besides, one end of the hydrogenated block copolymer (I)-20 had a structure of the following formula (iii). The other characteristics thereof are shown in Table 2.

$$(a\text{-}b)\text{-} \quad (iii)$$

wherein a represents the polymer block (a) principally containing a vinyl aromatic compound monomer unit, and b represents the hydrogenated copolymer block (b) containing a vinyl aromatic compound monomer unit and a conjugated diene monomer unit.

Production Example 21

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.030 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 75% by mass), a weight average molecular weight of 623,000, and a molecular weight distribution of 1.08.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-21.

The hydrogenated block copolymer (I)-21 thus obtained had a hydrogenation rate of 94%. The other characteristics thereof are shown in Table 2.

Production Example 22

A tank reactor (having a capacity of 10 L) equipped with a stirrer and a jacket was used for performing batch polymerization.

First, a cyclohexane solution (concentration of 20% by mass) containing 16 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 28 parts by mass of butadiene was added thereto, followed by polymerization at 60° C. for 2 hours. Next, a cyclohexane solution (concentration of 20% by mass) containing 16 parts by mass of styrene was charged, followed by polymerization at 70° C. for 20 minutes. Next, a cyclohexane solution (concentration of 20% by mass) containing 21 parts by mass of styrene and 14 parts by mass of butadiene was charged, followed by polymerization at 60° C. for 1 hour. Thereafter, methanol was added thereto to stop the polymerization reaction.

A block copolymer obtained in this manner had a styrene content of 53% by mass, a polystyrene block content of 32% by mass, a vinyl bond content of 70% by mass (a vinyl bond content in a conjugated diene polymer block of 75% by mass), a weight average molecular weight of 203,000, and a molecular weight distribution of 1.05.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-22.

The hydrogenated block copolymer (1)-22 thus obtained had a hydrogenation rate of 98%. The other characteristics thereof are shown in Table 2.

Production Example 23

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 0.3 moles per mole of n-butyllithium, and sodium-t-pentoxide was added in a ratio of 0.02 moles per mole of n-butyllithium, followed by polymerization at 70° C. for 20 minutes.

Next, a cyclohexane solution (concentration of 20% by mass) containing 74 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 38% by mass (a vinyl bond content in a conjugated diene polymer block of 40% by mass), a weight average molecular weight of 203,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-A.

The hydrogenated block copolymer (I)-A thus obtained had a hydrogenation rate of 96%. The other characteristics thereof are shown in Table 3.

Production Example 24

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 47 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 21 parts by mass of styrene and 14 parts by mass of butadiene was charged, followed by polymerization at 60° C. for 1 hour. Thereafter, methanol was added thereto to stop the polymerization reaction.

A block copolymer obtained in this manner had a styrene content of 34% by mass, a polystyrene block content of 13% by mass, a vinyl bond content of 45% by mass (a vinyl bond content in a conjugated diene polymer block of 75% by mass), a weight average molecular weight of 202,000, and a molecular weight distribution of 1.05.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-B.

The hydrogenated block copolymer (I)-B thus obtained had a hydrogenation rate of 96%. The other characteristics thereof are shown in Table 3.

Production Example 25

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 7.4 parts by mass of styrene and 0.6 parts by mass of butadiene was charged, followed by polymerization at 60° C. for 1 hour. Thereafter, methanol was added thereto to stop the polymerization reaction.

A block copolymer obtained in this manner had a styrene content of 20.4% by mass, a polystyrene block content of 13% by mass, a vinyl bond content of 70% by mass (a vinyl bond content in a conjugated diene polymer block of 75% by mass), a weight average molecular weight of 203,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-C.

The hydrogenated block copolymer (I)-C thus obtained had a hydrogenation rate of 96%. The other characteristics thereof are shown in Table 3.

Production Example 26

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 75% by mass), a weight average molecular weight of 201,000, and a molecular weight distribution of 1.03.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-D.

The hydrogenated block copolymer (I)-D thus obtained had a hydrogenation rate of 40%. The other characteristics thereof are shown in Table 3.

Production Example 27

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 82 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of butadiene was charged, followed by polymerization at 60° C. for 1 hour. Thereafter, methanol was added thereto to stop the polymerization reaction.

A block copolymer obtained in this manner had a styrene content of 13% by mass, a polystyrene block content of 13% by mass, a vinyl bond content of 73% by mass (a vinyl bond content in a conjugated diene polymer block of 75% by mass), a weight average molecular weight of 204,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-E.

The hydrogenated block copolymer (I)-E thus obtained had a hydrogenation rate of 96%. The other characteristics thereof are shown in Table 3.

Production Example 28

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 87 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 0.6 parts by mass of styrene and 0.4 parts by mass of butadiene was charged, followed by polymerization at 60° C. for 1 hour. Thereafter, methanol was added thereto to stop the polymerization reaction.

A block copolymer obtained in this manner had a styrene content of 13.6% by mass, a polystyrene block content of 13% by mass, a vinyl bond content of 72% by mass (a vinyl bond content in a conjugated diene polymer block of 75% by mass), a weight average molecular weight of 201,000, and a molecular weight distribution of 1.03.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-F.

The hydrogenated block copolymer (I)-F thus obtained had a hydrogenation rate of 95%. The other characteristics thereof are shown in Table 3.

Production Example 29

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 63 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 16 parts by mass of styrene and 11 parts by mass of butadiene was charged, followed by polymerization at 60° C. for 1 hour. Thereafter, methanol was added thereto to stop the polymerization reaction.

A block copolymer obtained in this manner had a styrene content of 27% by mass, a polystyrene block content of 13% by mass, a vinyl bond content of 58% by mass (a vinyl bond content in a conjugated diene polymer block of 75% by mass), a weight average molecular weight of 201,000, and a molecular weight distribution of 1.03.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-G.

The hydrogenated block copolymer (I)-G thus obtained had a hydrogenation rate of 95%. The other characteristics thereof are shown in Table 3.

Production Example 30

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 60 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Next, a cyclohexane solution (concentration of 20% by mass) containing 9 parts by mass of butadiene was charged, followed by polymerization at 60° C. for 1 hour. Thereafter, methanol was added thereto to stop the polymerization reaction.

A block copolymer obtained in this manner had a styrene content of 29% by mass, a polystyrene block content of 13% by mass, a vinyl bond content of 55% by mass (a vinyl bond content in a conjugated diene polymer block of 75% by mass), a weight average molecular weight of 202,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-H.

The hydrogenated block copolymer (I)-H thus obtained had a hydrogenation rate of 95%. The other characteristics thereof are shown in Table 3.

Production Example 31

A tank reactor (having a capacity of 10 L) equipped with a stirrer and a jacket was used for performing batch polymerization.

First, a cyclohexane solution (concentration of 20% by mass) containing 6.5 parts by mass of styrene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 67 parts by mass of butadiene was added thereto, followed by polymerization at 60° C. for 2 hours. Next, a cyclohexane solution (concentration of 20% by mass) containing 6.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Next, a cyclohexane solution (concentration of 20% by mass) containing 12 parts by mass of butadiene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 74% by mass), a weight average molecular weight of 202,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-I.

The hydrogenated block copolymer (I)-I thus obtained had a hydrogenation rate of 95%. Besides, one end of the hydrogenated block copolymer (I)-I had a structure of the following formula (ii). The other characteristics thereof are shown in Table 3.

$$(c\text{-}b)\text{-} \quad \quad \quad (ii)$$

wherein b represents the hydrogenated copolymer block (b) containing a vinyl aromatic compound monomer unit and a conjugated diene monomer unit, and c represents the hydrogenated polymer block (c) principally containing a conjugated diene monomer unit.

Production Example 32

A tank reactor (having a capacity of 10 L) equipped with a stirrer and a jacket was used for performing batch polymerization.

First, a cyclohexane solution (concentration of 20% by mass) containing 4.5 parts by mass of styrene was charged.

Next, n-butyllithium was added in a ratio of 0.081 parts by mass based on 100 parts by mass of all monomers, N,N,N',N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 79 parts by mass of butadiene was added thereto, followed by polymerization at 60° C. for 2 hours. Next, a cyclohexane solution (concentration of 20% by mass) containing 4.5 parts by mass of styrene was charged, followed by polymerization at 70° C. for 20 minutes. Next, a cyclohexane solution (concentration of 20% by mass) containing 5 parts by mass of styrene and 3 parts by mass of butadiene was charged, followed by polymerization at 60° C. for 1 hour. Then, a cyclohexane solution (concentration of 20% by mass) containing 2 parts by mass of styrene was charged, followed by polymerization at 60° C. for 1 hour. Thereafter, methanol was added thereto to stop the polymerization reaction.

A block copolymer obtained in this manner had a styrene content of 18% by mass, a polystyrene block content of 13% by mass, a vinyl bond content of 73% by mass (a vinyl bond content in a conjugated diene polymer block of 75% by mass), a weight average molecular weight of 202,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (I)-J.

The hydrogenated block copolymer (I)-J thus obtained had a hydrogenation rate of 95%. Besides, one end of the hydrogenated block copolymer (I)-J had a structure of the following formula (iii). The other characteristics thereof are shown in Table 3.

$$(a\text{-}b)\text{-} \quad \quad \quad (iii)$$

wherein a represents the polymer block (a) principally containing a vinyl aromatic compound monomer unit, and b represents the hydrogenated copolymer block (b) containing a vinyl aromatic compound monomer unit and a conjugated diene monomer unit.

TABLE 1

|  | Production Example 1 | Production Example 2 | Production Example 3 | Production Example 4 | Production Example 5 | Production Example 6 |
|---|---|---|---|---|---|---|
| Hydrogenated Block Copolymer | (I)-1 | (I)-2 | (I)-3 | (I)-4 | (I)-5 | (I)-6 |
| Content of All Vinyl Aromatic Compounds (mass %) | 18 | 18 | 18 | 14.5 | 21 | 26 |
| Content of Polymer Block (a) (mass %) | 13 | 13 | 13 | 13 | 13 | 13 |
| Content of Polymer Block (b) (mass %) | 8 | 8 | 8 | 2.5 | 13 | 22 |
| Content of Polymer Block (c) (mass %) | 79 | 79 | 79 | 84.5 | 74 | 65 |
| Weight Average Molecular Weight (ten thousand) | 20 | 20 | 20 | 20 | 20 | 20 |
| Vinyl Bond Content in Conjugated Diene Monomer Unit (mass %) | 73 | 62 | 51 | 74 | 70 | 62 |
| Vinyl Bond Content in Polymer Block (c) (mass %) | 75 | 65 | 55 | 75 | 75 | 75 |
| Hydrogenation Rate of Double Bonds in Conjugated Diene Monomer Unit (%) | >93 | >93 | >93 | >93 | >93 | >93 |
| Content of Vinyl Aromatic Compound in Polymer Block (b) (mass %) | 59 | 59 | 59 | 59 | 59 | 59 |

TABLE 1-continued

|  | | | | | | |
|---|---|---|---|---|---|---|
| Content of Vinyl Aromatic Compound in Polymer Block (b) based on Whole Polymer (mass %) | 5 | 5 | 5 | 1.5 | 8 | 13 |
| Content of Conjugated Diene in Polymer Block (b) based on Whole Polymer (mass %) | 3 | 3 | 3 | 1 | 5 | 9 |
| Content of Vinyl Aromatic Compound Monomer Unit adjacent to Conjugated Diene Monomer Unit (mass %) | 5 | 5 | 5 | 1.5 | 8 | 13 |
| Content of Polymer Block (a) at One End (mass %) | 0 | 0 | 0 | 0 | 0 | 0 |
| Content of Polymer Block (b) at One End (mass %) | 8 | 8 | 8 | 2.5 | 13 | 22 |
| Content of Polymer Block (c) at One End (mass %) | 0 | 0 | 0 | 0 | 0 | 0 |
| tanδ Peak Temperature (° C.): less than −25° C. | −33 | −35 | −37 | −33 | −33 | −35 |
| tanδ Peak Temperature (° C.): −25° C. to 80° C. | 0 | −2 | −5 | −4 | 3 | 6 |
| Hardness (JIS-A, 10 s) | 30 | 32 | 35 | 28 | 32 | 37 |
| Tensile Strength (MPa) | 0.8 | 1.5 | 2.5 | 0.7 | 1.2 | 2.5 |
| Elongation at Break (%) | >2000 | 1700 | 1300 | >2000 | >2000 | 1600 |

|  | Production Example 7 | Production Example 8 | Production Example 9 | Production Example 10 |
|---|---|---|---|---|
| Hydrogenated Block Copolymer | (I)-7 | (I)-8 | (I)-9 | (I)-10 |
| Content of All Vinyl Aromatic Compounds (mass %) | 18 | 18 | 26 | 18 |
| Content of Polymer Block (a) (mass %) | 13 | 13 | 21 | 13 |
| Content of Polymer Block (b) (mass %) | 8 | 8 | 8 | 8 |
| Content of Polymer Block (c) (mass %) | 79 | 79 | 71 | 79 |
| Weight Average Molecular Weight (ten thousand) | 40 | 10 | 20 | 20 |
| Vinyl Bond Content in Conjugated Diene Monomer Unit (mass %) | 73 | 73 | 70 | 73 |
| Vinyl Bond Content in Polymer Block (c) (mass %) | 75 | 75 | 75 | 75 |
| Hydrogenation Rate of Double Bonds in Conjugated Diene Monomer Unit (%) | >93 | >93 | >93 | 80 |
| Content of Vinyl Aromatic Compound in Polymer Block (b) (mass %) | 59 | 59 | 59 | 59 |
| Content of Vinyl Aromatic Compound in Polymer Block (b) based on Whole Polymer (mass %) | 5 | 5 | 5 | 5 |
| Content of Conjugated Diene in Polymer Block (b) based on Whole Polymer (mass %) | 3 | 3 | 3 | 3 |
| Content of Vinyl Aromatic Compound Monomer Unit adjacent to Conjugated Diene Monomer Unit (mass %) | 5 | 5 | 5 | 5 |
| Content of Polymer Block (a) at One End (mass %) | 0 | 0 | 0 | 0 |
| Content of Polymer Block (b) at One End (mass %) | 8 | 8 | 8 | 8 |
| Content of Polymer Block (c) at One End (mass %) | 0 | 0 | 0 | 0 |
| tanδ Peak Temperature (° C.): less than −25° C. | −33 | −33 | −33 | −45 |
| tanδ Peak Temperature (° C.): −25° C. to 80° C. | 0 | 0 | 0 | −3 |
| Hardness (JIS-A, 10 s) | 45 | 30 | 35 | 40 |
| Tensile Strength (MPa) | 3.1 | 0.7 | 1.5 | 1.6 |
| Elongation at Break (%) | 1500 | >2000 | 1800 | 1800 |

TABLE 2

|  | Production Example 11 | Production Example 12 | Production Example 13 | Production Example 14 | Production Example 15 | Production Example 16 |
|---|---|---|---|---|---|---|
| Hydrogenated Block Copolymer | (I)-11 | (I)-12 | (I)-13 | (I)-14 | (I)-15 | (I)-16 |
| Content of All Vinyl Aromatic Compounds (mass %) | 18 | 15.5 | 19 | 20 | 18 | 18 |
| Content of Polymer Block (a) (mass %) | 13 | 13 | 13 | 13 | 13 | 13 |
| Content of Polymer Block (b) (mass %) | 8 | 8 | 8 | 8 | 8 | 8 |
| Content of Polymer Block (c) (mass %) | 79 | 79 | 79 | 79 | 79 | 79 |
| Weight Average Molecular Weight (ten thousand) | 20 | 20 | 20 | 20 | 20 | 20 |
| Vinyl Bond Content in Conjugated Diene Monomer Unit (mass %) | 73 | 74 | 70 | 68 | 73 | 73 |
| Vinyl Bond Content in Polymer Block (c) (mass %) | 75 | 75 | 75 | 75 | 75 | 75 |
| Hydrogenation Rate of Double Bonds in Conjugated Diene Monomer Unit (%) | 60 | >93 | >93 | >93 | >93 | >93 |
| Content of Vinyl Aromatic Compound in Polymer Block (b) (mass %) | 59 | 30 | 75 | 88 | 59 | 59 |
| Content of Vinyl Aromatic Compound in Polymer Block (b) based on Whole Polymer (mass %) | 5 | 2.5 | 6 | 7 | 5 | 5 |
| Content of Conjugated Diene in Polymer Block (b) based on Whole Polymer (mass %) | 3 | 5.5 | 2 | 1 | 3 | 3 |
| Content of Vinyl Aromatic Compound Monomer Unit adjacent to Conjugated Diene Monomer Unit (mass %) | 5 | 2.5 | 6 | 4 | 5 | 5 |
| Content of Polymer Block (a) at One End (mass %) | 0 | 0 | 0 | 0 | 0 | 0 |
| Content of Polymer Block (b) at One End (mass %) | 8 | 8 | 8 | 8 | 8 | 8 |
| Content of Polymer Block (c) at One End (mass %) | 0 | 0 | 0 | 0 | 0 | 0 |
| tanδ Peak Temperature (° C.): less than −25° C. | −60 | −33 | −33 | −33 | −33 | −33 |

TABLE 2-continued

| | | | | | | |
|---|---|---|---|---|---|---|
| tanδ Peak Temperature (° C.): −25° C. to 80° C. | −7 | −20 | 30 | 70 | 0 | 0 |
| Hardness (JIS-A, 10 s) | 45 | 25 | 25 | 30 | 35 | 40 |
| Tensile Strength (MPa) | 3.5 | 0.5 | 2 | 10 | 1.5 | 3.5 |
| Elongation at Break (%) | 1500 | >2000 | 1600 | 1200 | >2000 | 1200 |

| | Production Example 17 | Production Example 18 | Production Example 19 | Production Example 20 | Production Example 21 | Production Example 22 |
|---|---|---|---|---|---|---|
| Hydrogenated Block Copolymer | (I)-17 | (I)-18 | (I)-19 | (I)-20 | (I)-21 | (I)-22 |
| Content of All Vinyl Aromatic Compounds (mass %) | 17 | 17 | 18 | 18 | 18 | 53 |
| Content of Polymer Block (a) (mass %) | 6.5 | 6.5 | 13 | 13 | 13 | 32 |
| Content of Polymer Block (b) (mass %) | 17.5 | 17.5 | 8 | 8 | 13 | 13 |
| Content of Polymer Block (c) (mass %) | 76 | 76 | 79 | 79 | 74 | 55 |
| Weight Average Molecular Weight (ten thousand) | 20 | 20 | 20 | 20 | 62 | 20 |
| Vinyl Bond Content in Conjugated Diene Monomer Unit (mass %) | 73 | 73 | 73 | 73 | 73 | 70 |
| Vinyl Bond Content in Polymer Block (c) (mass %) | 75 | 75 | 74 | 75 | 75 | 75 |
| Hydrogenation Rate of Double Bonds in Conjugated Diene Monomer Unit (%) | >93 | >93 | >93 | >93 | >93 | >93 |
| Content of Vinyl Aromatic Compound in Polymer Block (b) (mass %) | 59 | 59 | 59 | 59 | 59 | 59 |
| Content of Vinyl Aromatic Compound in Polymer Block (b) based on Whole Polymer (mass %) | 10.5 | 10.5 | 5 | 5 | 5 | 7.5 |
| Content of Conjugated Diene in Polymer Block (b) based on Whole Polymer (mass %) | 7 | 7 | 3 | 3 | 3 | 5.5 |
| Content of Vinyl Aromatic Compound Monomer Unit adjacent to Conjugated Diene Monomer Unit (mass %) | 10.5 | 10.5 | 5 | 5 | 5 | 7.5 |
| Content of Polymer Block (a) at One End (mass %) | 0 | 0 | 0 | 2 | 0 | 0 |
| Content of Polymer Block (b) at One End (mass %) | 17.5 | 17.5 | 8 | 8 | 13 | 13 |
| Content of Polymer Block (c) at One End (mass %) | 0 | 0 | 9 | 0 | 0 | 0 |
| tanδ Peak Temperature (° C.): less than −25° C. | −33 | −33 | −33 | −33 | −33 | −36 |
| tanδ Peak Temperature (° C.): −25° C. to 80° C. | 0 | 0 | −5 | 4 | 3 | 10 |
| Hardness (JIS-A, 10 s) | 28 | 30 | 25 | 37 | 50 | 40 |
| Tensile Strength (MPa) | 0.5 | 0.4 | 0.6 | 1.1 | 6 | 7.2 |
| Elongation at Break (%) | >2000 | 1300 | >2000 | 1200 | 1100 | 1200 |

TABLE 3

| | Production Example 23 | Production Example 24 | Production Example 25 | Production Example 26 | Production Example 27 |
|---|---|---|---|---|---|
| Hydrogenated Block Copolymer | (I)-A | (I)-B | (I)-C | (I)-D | (I)-E |
| Content of All Vinyl Aromatic Compounds (mass %) | 18 | 34 | 20.4 | 18 | 13 |
| Content of Polymer Block (a) (mass %) | 13 | 13 | 13 | 13 | 13 |
| Content of Polymer Block (b) (mass %) | 13 | 40 | 8 | 8 | 0 |
| Content of Polymer Block (c) (mass %) | 74 | 47 | 79 | 79 | 87 |
| Weight Average Molecular Weight (ten thousand) | 20 | 20 | 20 | 20 | 12 |
| Vinyl Bond Content in Conjugated Diene Monomer Unit (mass %) | 38 | 45 | 70 | 73 | 73 |
| Vinyl Bond Content in Polymer Block (c) (mass %) | 40 | 75 | 75 | 75 | 75 |
| Hydrogenation Rate of Double Bonds in Conjugated Diene Monomer Unit (%) | >93 | >93 | >93 | 40 | >93 |
| Content of Vinyl Aromatic Compound in Polymer Block (b) (mass %) | 59 | 59 | 92 | 59 | 59 |
| Content of Vinyl Aromatic Compound in Polymer Block (b) based on Whole Polymer (mass %) | 5 | 24 | 7.4 | 5 | 0 |
| Content of Conjugated Diene in Polymer Block (b) based on Whole Polymer (mass %) | 3 | 16 | 0.6 | 3 | 0 |
| Content of Vinyl Aromatic Compound Monomer Unit adjacent to Conjugated Diene Monomer Unit (mass %) | 5 | 24 | 2 | 5 | 0 |
| Content of Polymer Block (a) at One End (mass %) | 0 | 0 | 0 | 0 | 0 |
| Content of Polymer Block (b) at One End (mass %) | 13 | 40 | 8 | 8 | 0 |
| Content of Polymer Block (c) at One End (mass %) | 0 | 0 | 0 | 0 | 0 |
| tanδ Peak Temperature (° C.): less than −25° C. | −37 | −33 | −33 | −70 | −30 |
| tanδ Peak Temperature (° C.): −25° C. to 80° C. | 3 | 10 | 85 | −7 | — |
| Hardness (JIS-A, 10 s) | 45 | 35 | 32 | 28 | 42 |
| Tensile Strength (MPa) | 4.2 | 1.5 | 12 | 4 | 9.5 |
| Elongation at Break (%) | 900 | 1000 | 700 | 900 | 1000 |

| | Production Example 28 | Production Example 29 | Production Example 30 | Production Example 31 | Production Example 32 |
|---|---|---|---|---|---|
| Hydrogenated Block Copolymer | (I)-F | (I)-G | (I)-H | (I)-I | (I)-J |
| Content of All Vinyl Aromatic Compounds (mass %) | 13.6 | 27 | 29 | 18 | 18 |
| Content of Polymer Block (a) (mass %) | 13 | 13 | 13 | 13 | 13 |

TABLE 3-continued

| | | | | | |
|---|---|---|---|---|---|
| Content of Polymer Block (b) (mass %) | 1 | 24 | 27 | 8 | 8 |
| Content of Polymer Block (c) (mass %) | 86 | 63 | 60 | 79 | 79 |
| Weight Average Molecular Weight (ten thousand) | 20 | 20 | 20 | 20 | 20 |
| Vinyl Bond Content in Conjugated Diene Monomer Unit (mass %) | 72 | 58 | 55 | 73 | 73 |
| Vinyl Bond Content in Polymer Block (c) (mass %) | 75 | 75 | 75 | 74 | 75 |
| Hydrogenation Rate of Double Bonds in Conjugated Diene Monomer Unit (%) | >93 | >93 | >93 | >93 | >93 |
| Content of Vinyl Aromatic Compound in Polymer Block (b) (mass %) | 59 | 59 | 59 | 59 | 59 |
| Content of Vinyl Aromatic Compound in Polymer Block (b) based on Whole Polymer (mass %) | 0.6 | 14 | 16 | 5 | 5 |
| Content of Conjugated Diene in Polymer Block (b) based on Whole Polymer (mass %) | 0.4 | 10 | 11 | 3 | 3 |
| Content of Vinyl Aromatic Compound Monomer Unit adjacent to Conjugated Diene Monomer Unit (mass %) | 0.6 | 14 | 16 | 5 | 5 |
| Content of Polymer Block (a) at One End (mass %) | 0 | 0 | 0 | 0 | 4 |
| Content of Polymer Block (b) at One End (mass %) | 1 | 24 | 27 | 8 | 8 |
| Content of Polymer Block (c) at One End (mass %) | 0 | 0 | 0 | 12 | 0 |
| tanδ Peak Temperature (° C.): less than −25° C. | −33 | −33 | −33 | −33 | −33 |
| tanδ Peak Temperature (° C.): −25° C. to 80° C. | 0 | 8 | 10 | −7 | 7 |
| Hardness (JIS-A, 10 s) | 40 | 38 | 40 | 28 | 40 |
| Tensile Strength (MPa) | 3.5 | 2.5 | 2.7 | 0.9 | 1.6 |
| Elongation at Break (%) | 1100 | 1500 | 1300 | >2000 | 700 |

Production Example 33

(Hydrogenated Block Copolymer (III))

A tank reactor (having a capacity of 10 L) equipped with a stirrer and a jacket was used for performing batch polymerization.

First, a cyclohexane solution (concentration of 20% by mass) containing 20 parts by mass of styrene was charged. Next, n-butyllithium was added in a ratio of 0.081 parts by mass based on 100 parts by mass of all monomers, N,N,N′,N′-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 47 parts by mass of styrene and 33 parts by mass of butadiene was charged, followed by polymerization at 60° C. for 1 hour. Next, ethyl benzoate was added in a ratio of 0.25 moles per mole of n-butyllithium, and the resultant was reacted at 70° C. for 10 minutes. Thereafter, methanol was added thereto to stop the polymerization reaction.

A block copolymer obtained in this manner had a styrene content of 67% by mass, a polystyrene block content of 20% by mass, a vinyl bond content of 25% by mass, a weight average molecular weight of 270,000, and a molecular weight distribution of 1.04. Besides, a coupling ratio obtained based on a peak area ratio on a GPC curve was 50%.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (III)-1.

The hydrogenated block copolymer (III)-1 thus obtained had a hydrogenation rate of 98%. The other characteristics thereof are shown in Table 4.

Production Example 34

A tank reactor (having a capacity of 10 L) equipped with a stirrer and a jacket was used for performing batch polymerization.

First, a cyclohexane solution (concentration of 20% by mass) containing 7.5 parts by mass of styrene was charged. Next, n-butyllithium was added in a ratio of 0.11 parts by mass based on 100 parts by mass of all monomers, N,N,N′,N′-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 36 parts by mass of styrene and 49 parts by mass of butadiene was charged, followed by polymerization at 60° C. for 1 hour. A cyclohexane solution (concentration of 20% by mass) containing 7.5 parts by mass of styrene was charged, followed by polymerization at 70° C. for 1 hour. Thereafter, methanol was added thereto to stop the polymerization reaction.

A block copolymer obtained in this manner had a styrene content of 51% by mass, a polystyrene block content of 15% by mass, a vinyl bond content of 21% by mass, a weight average molecular weight of 150,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (III)-2.

The hydrogenated block copolymer (III)-2 thus obtained had a hydrogenation rate of 97%. The other characteristics thereof are shown in Table 4.

Production Example 35

A tank reactor (having a capacity of 10 L) equipped with a stirrer and a jacket was used for performing batch polymerization.

First, a cyclohexane solution (concentration of 20% by mass) containing 7.5 parts by mass of styrene was charged. Next, n-butyllithium was added in a ratio of 0.10 parts by mass based on 100 parts by mass of all monomers, N,N,N', N'-tetramethylethylenediamine (hereinafter referred to as the "TMEDA") was added in a ratio of 1.8 moles per mole of n-butyllithium, and sodium-t-pentoxide was added in a ratio of 0.08 moles per mole of n-butyllithium, followed by polymerization at 70° C. for 20 minutes.

Next, a cyclohexane solution (concentration of 20% by mass) containing 17 parts by mass of styrene and 67 parts by mass of butadiene was charged, followed by polymerization at 60° C. for 1 hour. A cyclohexane solution (concentration of 20% by mass) containing 7.5 parts by mass of styrene was charged, followed by polymerization at 70° C. for 1 hour. Thereafter, methanol was added thereto to stop the polymerization reaction.

A block copolymer obtained in this manner had a styrene content of 33% by mass, a polystyrene block content of 15% by mass, a vinyl bond content of 68% by mass, a weight average molecular weight of 160,000, and a molecular weight distribution of 1.04.

To the thus obtained block copolymer, the hydrogenation catalyst prepared as described above was added in an amount of 100 ppm, in terms of Ti, per 100 parts by mass of the block copolymer, followed by a hydrogenation reaction at a hydrogen pressure of 0.7 MPa and a temperature of 65° C.

Next, octadecyl-3-(3,5-di-t-butyl-4-hydroxyphenyl)propionate, used as a stabilizer, was added in an amount of 0.3 parts by mass based on 100 parts by mass of the copolymer to obtain a hydrogenated block copolymer (III)-3.

The hydrogenated block copolymer (III)-3 thus obtained had a hydrogenation rate of 97%. The other characteristics thereof are shown in Table 4.

Production Application Examples 1 to 32

Each of the hydrogenated block copolymers (I)-1 to (I)-22 and (I)-A to (I)-J produced as described above was rolled out by using a 4-inch roll at 160° C., and the resultant was pressed at 200° C. and 100 kg/cm$^2$ by using a hydraulic press to produce a molded sheet having a thickness of 2 mm.

With respect to the structure of each of the hydrogenated block copolymers (I)-1 to (I)-22 and (I)-A to (I)-J of [Production Examples 1 to 32] described above, values of the following items were measured:

Content (% by mass) of all vinyl aromatic compound monomer units

Content (% by mass) of polymer block (a) principally containing vinyl aromatic compound monomer unit Content (% by mass) of hydrogenated copolymer block (b) containing vinyl aromatic compound monomer unit and conjugated diene monomer unit Content (% by mass) of hydrogenated polymer block (c) principally containing conjugated diene monomer unit Content (% by mass) of vinyl aromatic compound monomer unit in the hydrogenated copolymer block (b)

Vinyl bond content (% by mass) in conjugated diene monomer unit

Vinyl bond content (% by mass) in the hydrogenated polymer block (c)

Weight average molecular weight (ten thousand)

Hydrogenation rate (%) of double bonds in conjugated diene monomer unit

Content (% by mass) of vinyl aromatic compound monomer unit adjacent to conjugated diene monomer unit Content (% by mass) of each polymer block at end Besides, a tan δ (loss tangent) peak temperature in temperature regions less than −25° C. and −25 to 80° C. in a viscoelasticity measurement chart of each of the hydrogenated block copolymers (I)-1 to (I)-22 and (I)-A to (I)-J was measured.

It is noted that the polymer blocks (a) to (c) respectively represent the following polymer blocks:

Polymer block (a): polymer block principally containing vinyl aromatic compound monomer unit Polymer block (b): hydrogenated copolymer block containing vinyl aromatic compound monomer unit and conjugated diene monomer unit

TABLE 4

| | Production Example 33 | Production Example 34 | Production Example 35 |
|---|---|---|---|
| Hydrogenated Block Copolymer | (III)-1 | (III)-2 | (III)-3 |
| Content of All Vinyl Aromatic Compounds (mass %) | 67 | 51 | 33 |
| Content of Polymer Block (A) (mass %) | 20 | 15 | 15 |
| Content of Polymer Block (B) (mass %) | 80 | 85 | 84 |
| Weight Average Molecular Weight (ten thousand) | 27 | 15 | 16 |
| Vinyl Bond Content in Conjugated Diene Monomer Unit (mass %) | 25 | 21 | 68 |
| Hydrogenation Rate of Double Bonds in Conjugated Diene Monomer Unit (%) | >93 | >93 | >93 |
| Content of Vinyl Aromatic Compound in Polymer Block (B) (mass %) | 59 | 42 | 20 |
| Content of Vinyl Aromatic Compound in Polymer Block (B) based on Whole Polymer (mass %) | 47 | 36 | 17 |
| Content of Conjugated Diene in Polymer Block (B) based on Whole Polymer (mass %) | 33 | 49 | 67 |
| tanδ Peak Temperature (° C.): less than −25° C. | — | — | — |
| tanδ Peak Temperature (° C.): −25° C. to 80° C. | 18 | −13 | −16 |
| Hardness (JIS-A, 10 s) | 25 | 67 | 41 |
| Tensile Strength (MPa) | 32 | 20 | 21 |
| Elongation at Break (%) | 460 | 490 | 700 |

Polymer block (c): hydrogenated polymer block principally containing conjugated diene monomer unit With respect to the structures of the hydrogenated block copolymers (III)-1 to (III)-3 of [Production Examples 33 to 35], values of the following items were measured:

Content (% by mass) of all vinyl aromatic compound monomer units

Content (% by mass) of polymer block (A) principally containing vinyl aromatic compound monomer unit Content (% by mass) of hydrogenated copolymer block (B) containing vinyl aromatic compound monomer unit and conjugated diene monomer unit Content (% by mass) of vinyl aromatic compound monomer unit in the hydrogenated copolymer block (B)

Weight average molecular weight (ten thousand)

Vinyl bond content (% by mass) in conjugated diene monomer unit

Hydrogenation rate (%) of double bonds in conjugated diene monomer unit

Besides, a tan δ (loss tangent) peak temperature in temperature regions less than −25° C. and −25 to 80° C. in a viscoelasticity measurement chart of each of the hydrogenated block copolymers (III)-1 to (III)-3 was measured.

It is noted that the polymer blocks (A) and (B) respectively represent the following polymer blocks:

Polymer block (A): polymer block principally containing vinyl aromatic compound monomer unit Polymer block (B): hydrogenated copolymer block containing vinyl aromatic compound monomer unit and conjugated diene monomer unit

[Production of Hydrogenated Block Copolymer Composition]

Hydrogenated block copolymer compositions were produced using the hydrogenated block copolymers obtained in the above-described production examples and the following olefin-based resin (II).

<Olefin-Based Resin (II)>

As the olefin-based resin (II), PM801A (PP, manufactured by Sum Allomer, Ltd.; MFR=15) was used.

Example 1

The hydrogenated block copolymer (I)-1 formed into a pellet shape and the olefin-based resin (II) were compounded in a ratio shown in Table 5 below, the resultant was kneaded using a twin screw extruder (TEX-30) into a pellet shape, and thus, a hydrogenated block copolymer composition was obtained. Conditions for extrusion were a cylinder temperature of 230° C., and a screw speed of 300 rpm. The thus obtained composition was compression molded at 200° C. to produce a sheet having a thickness of 2 mm, and thus, a physical property measurement sample was obtained. Results of physical property measurement are shown in Table 5.

Examples 2 to 27 and Comparative Examples 1 to 11

Hydrogenated block copolymer compositions were produced in the same manner as in Example 1 except that the respective components were changed as shown in Tables 5 to 8, and their physical properties were measured. Results of the physical property measurement are shown in Tables 5 to 8.

TABLE 5

|  | Example 1 | Example 2 | Example 3 | Example 4 | Example 5 | Example 6 |
|---|---|---|---|---|---|---|
| Hydrogenated Block Polymer (I)-1 | 50 | 70 | 5 | — | — | — |
| Hydrogenated Block Polymer (I)-2 | — | — | — | 5 | — | — |
| Hydrogenated Block Polymer (I)-3 | — | — | — | — | 5 | — |
| Hydrogenated Block Polymer (I)-4 | — | — | — | — | — | 5 |
| Hydrogenated Block Polymer (I)-5 | — | — | — | — | — | — |
| Hydrogenated Block Polymer (I)-6 | — | — | — | — | — | — |
| Hydrogenated Block Polymer (I)-7 | — | — | — | — | — | — |
| Hydrogenated Block Polymer (I)-8 | — | — | — | — | — | — |
| Hydrogenated Block Polymer (I)-9 | — | — | — | — | — | — |
| Hydrogenated Block Polymer (I)-10 | — | — | — | — | — | — |
| Hydrogenated Block Polymer (III)-1 | — | — | 65 | 65 | 65 | 65 |
| Olefin-based Resin (II) | 50 | 30 | 30 | 30 | 30 | 30 |
| Wear Resistance | ⊚ | ○ | ⊚ | ○ | ○ | ○ |
| Elongation at Break at −30° C. (%) | 100 | 200 | 150 | 140 | 120 | 120 |
| Extrusion Moldability | 3 | 3 | 3 | 3 | 3 | 3 |

|  | Example 7 | Example 8 | Example 9 | Example 10 | Example 11 | Example 12 |
|---|---|---|---|---|---|---|
| Hydrogenated Block Polymer (I)-1 | — | — | — | — | — | — |
| Hydrogenated Block Polymer (I)-2 | — | — | — | — | — | — |
| Hydrogenated Block Polymer (I)-3 | — | — | — | — | — | — |
| Hydrogenated Block Polymer (I)-4 | — | — | — | — | — | — |
| Hydrogenated Block Polymer (I)-5 | 5 | — | — | — | — | — |
| Hydrogenated Block Polymer (I)-6 | — | 5 | — | — | — | — |
| Hydrogenated Block Polymer (I)-7 | — | — | 5 | — | — | — |
| Hydrogenated Block Polymer (I)-8 | — | — | — | 5 | — | — |
| Hydrogenated Block Polymer (I)-9 | — | — | — | — | 5 | — |
| Hydrogenated Block Polymer (I)-10 | — | — | — | — | — | 5 |
| Hydrogenated Block Polymer (III)-1 | 65 | 65 | 65 | 65 | 65 | 65 |
| Olefin-based Resin (II) | 30 | 30 | 30 | 30 | 30 | 30 |
| Wear Resistance | ⊚ | ⊚ | ⊚ | ⊚ | ⊚ | ○ |
| Elongation at Break at −30° C. (%) | 160 | 130 | 100 | 170 | 140 | 130 |
| Extrusion Moldability | 3 | 3 | 3 | 3 | 3 | 3 |

TABLE 6

|  | Example 13 | Example 14 | Example 15 | Example 16 | Example 17 | Example 18 | Example 19 |
|---|---|---|---|---|---|---|---|
| Hydrogenated Block Polymer (I)-1 | — | — | — | — | — | — | — |
| Hydrogenated Block Polymer (I)-11 | 5 | — | — | — | — | — | — |
| Hydrogenated Block Polymer (I)-12 | — | 5 | — | — | — | — | — |
| Hydrogenated Block Polymer (I)-13 | — | — | 5 | — | — | — | — |
| Hydrogenated Block Polymer (I)-14 | — | — | — | 5 | — | — | — |
| Hydrogenated Block Polymer (I)-15 | — | — | — | — | 5 | — | — |
| Hydrogenated Block Polymer (I)-16 | — | — | — | — | — | 5 | — |
| Hydrogenated Block Polymer (I)-17 | — | — | — | — | — | — | 5 |
| Hydrogenated Block Polymer (I)-18 | — | — | — | — | — | — | — |
| Hydrogenated Block Polymer (I)-19 | — | — | — | — | — | — | — |
| Hydrogenated Block Polymer (I)-20 | — | — | — | — | — | — | — |
| Hydrogenated Block Polymer (I)-21 | — | — | — | — | — | — | — |
| Hydrogenated Block Polymer (I)-22 | — | — | — | — | — | — | — |
| Hydrogenated Block Polymer (III)-1 | 65 | 65 | 65 | 65 | 65 | 65 | 65 |
| Olefin-based Resin (II) | 30 | 30 | 30 | 30 | 30 | 30 | 30 |
| Wear Resistance | ⊚ | ⊚ | ⊚ | ◯ | ◯ | ◯ | ⊚ |
| Elongation at Break at −30° C. (%) | 150 | 160 | 120 | 100 | 140 | 120 | 160 |
| Extrusion Moldability | 3 | 3 | 3 | 3 | 3 | 3 | 3 |

|  | Example 20 | Example 21 | Example 22 | Example 23 | Example 24 | Example 25 |
|---|---|---|---|---|---|---|
| Hydrogenated Block Polymer (I)-1 | — | 35 | — | — | — | — |
| Hydrogenated Block Polymer (I)-11 | — | — | — | — | — | — |
| Hydrogenated Block Polymer (I)-12 | — | — | — | — | — | — |
| Hydrogenated Block Polymer (I)-13 | — | — | — | — | — | — |
| Hydrogenated Block Polymer (I)-14 | — | — | — | — | — | — |
| Hydrogenated Block Polymer (I)-15 | — | — | — | — | — | — |
| Hydrogenated Block Polymer (I)-16 | — | — | — | — | — | — |
| Hydrogenated Block Polymer (I)-17 | — | — | — | — | — | — |
| Hydrogenated Block Polymer (I)-18 | 5 | — | — | — | — | — |
| Hydrogenated Block Polymer (I)-19 | — | — | 5 | — | — | — |
| Hydrogenated Block Polymer (I)-20 | — | — | — | 5 | — | — |
| Hydrogenated Block Polymer (I)-21 | — | — | — | — | 5 | — |
| Hydrogenated Block Polymer (I)-22 | — | — | — | — | — | 5 |
| Hydrogenated Block Polymer (III)-1 | 65 | 35 | 65 | 65 | 65 | 65 |
| Olefin-based Resin (II) | 30 | 30 | 30 | 30 | 30 | 30 |
| Wear Resistance | ⊚ | ◯ | ⊚ | ⊚ | ⊚ | ⊚ |
| Elongation at Break at −30° C. (%) | 130 | 220 | 160 | 120 | 70 | 70 |
| Extrusion Moldability | 3 | 3 | 3 | 3 | 2 | 2 |

TABLE 7

|  | Example 26 | Example 27 |
|---|---|---|
| Hydrogenated Block Polymer (I)-1 | 5 | 5 |
| Hydrogenated Block Polymer (III)-2 | 65 | — |
| Hydrogenated Block Polymer (III)-3 | — | 65 |
| Olefin-based Resin (II) | 30 | 30 |
| Wear Resistance | ◯ | ◯ |
| Elongation at Break at −30° C. (%) | 200 | 350 |
| Extrusion Moldability | 3 | 3 |

TABLE 8

|  | Comparative Example 1 | Comparative Example 2 | Comparative Example 3 | Comparative Example 4 | Comparative Example 5 | Comparative Example 6 |
|---|---|---|---|---|---|---|
| Hydrogenated Block Polymer (I)-A | — | 5 | — | — | — | — |
| Hydrogenated Block Polymer (I)-B | — | — | 5 | — | — | — |
| Hydrogenated Block Polymer (I)-C | — | — | — | 5 | — | — |
| Hydrogenated Block Polymer (I)-D | — | — | — | — | 5 | — |
| Hydrogenated Block Polymer (I)-E | — | — | — | — | — | 5 |
| Hydrogenated Block Polymer (I)-F | — | — | — | — | — | — |
| Hydrogenated Block Polymer (I)-G | — | — | — | — | — | — |
| Hydrogenated Block Polymer (I)-H | — | — | — | — | — | — |
| Hydrogenated Block Polymer (I)-I | — | — | — | — | — | — |
| Hydrogenated Block Polymer (I)-J | — | — | — | — | — | — |
| Hydrogenated Block Polymer (III)-1 | 70 | 65 | 65 | 65 | 65 | 65 |
| Olefin-based Resin (II) | 30 | 30 | 30 | 30 | 30 | 30 |
| Wear Resistance | X | X | ⊚ | ⊚ | X | X |
| Elongation at Break at −30° C. (%) | 30 | 70 | 40 | 10 | 40 | 100 |
| Extrusion Moldability | 1 | 1 | 2 | 3 | 1 | 3 |

TABLE 8-continued

|  | Comparative Example 7 | Comparative Example 8 | Comparative Example 9 | Comparative Example 10 | Comparative Example 11 |
|---|---|---|---|---|---|
| Hydrogenated Block Polymer (I)-A | — | — | — | — | — |
| Hydrogenated Block Polymer (I)-B | — | — | — | — | — |
| Hydrogenated Block Polymer (I)-C | — | — | — | — | — |
| Hydrogenated Block Polymer (I)-D | — | — | — | — | — |
| Hydrogenated Block Polymer (I)-E | — | — | — | — | — |
| Hydrogenated Block Polymer (I)-F | 5 | — | — | — | — |
| Hydrogenated Block Polymer (I)-G | — | 5 | — | — | — |
| Hydrogenated Block Polymer (I)-H | — | — | 5 | — | — |
| Hydrogenated Block Polymer (I)-I | — | — | — | 5 | — |
| Hydrogenated Block Polymer (I)-J | — | — | — | — | 5 |
| Hydrogenated Block Polymer (III)-1 | 65 | 65 | 65 | 65 | 65 |
| Olefin-based Resin (II) | 30 | 30 | 30 | 30 | 30 |
| Wear Resistance | X | ○ | ○ | X | X |
| Elongation at Break at −30° C. (%) | 100 | 90 | 70 | 70 | 50 |
| Extrusion Moldability | 3 | 2 | 2 | 3 | 2 |

This application is based upon Japanese Patent Application filed on Mar. 20, 2019 (Japanese Patent Application No. 2019-053676), the contents of which are incorporated herein by reference.

INDUSTRIAL APPLICABILITY

A hydrogenated block copolymer and a composition thereof according to the present invention are excellent in wear resistance and low-temperature elongation, and has good moldability.

Owing to these features, the hydrogenated block copolymer and the composition thereof according to the present invention can be made into molded articles having various shapes by injection molding, extrusion molding or the like, and can be used in vehicle components (vehicle interior materials and vehicle exterior materials), materials of medical instruments, various containers including food packaging containers, home appliances, industrial components, toys and the like.

The invention claimed is:

1. A hydrogenated block copolymer that is a hydrogenated product of a copolymer comprising a vinyl aromatic compound monomer unit and a conjugated diene monomer unit, and that satisfies the following conditions (1) to (5):
   (1) the hydrogenated block copolymer comprises at least one of the following polymer blocks (b) and (c):
   a hydrogenated copolymer block (b) comprising a vinyl aromatic compound monomer unit and a conjugated diene monomer unit; and
   a hydrogenated polymer block (c) principally comprising a conjugated diene monomer unit;
   (2) the hydrogenated block copolymer has elongation at break measured in accordance with JIS K 6251 of 1000% or more;
   (3) the hydrogenated block copolymer has at least one peak of tan δ in a viscoelasticity measurement chart at −25° C. or more and 80° C. or less;
   (4) total content of a vinyl aromatic compound monomer unit adjacent to a conjugated diene monomer unit is 1 to 13% by mass; and
   (5) the hydrogenated block polymer comprises at one or more ends, a hydrogenated copolymer block including any one of structures of the following formulas (i) to (iii), wherein a content of the hydrogenated polymer block (c) is 0 to 10% by mass and a content of a polymer block (a) is 0 to 2% by mass in the one end:

[Structure at one end]

$$(b)- \quad\quad\quad\quad (i);$$

$$(c-b)- \quad\quad\quad\quad (ii); \text{ and}$$

$$(a-b)- \quad\quad\quad\quad (iii),$$

wherein a represents the polymer block (a) principally comprising a vinyl aromatic compound monomer unit, b represents the hydrogenated copolymer block (b) comprising a vinyl aromatic compound monomer unit and a conjugated diene monomer unit, and c represents the hydrogenated polymer block (c) principally comprising a conjugated diene monomer unit.

2. The hydrogenated block copolymer according to claim 1, wherein a vinyl bond content in the hydrogenated polymer block (c) is 50% by mass or more.

3. The hydrogenated block copolymer according to claim 1, wherein a vinyl bond content in the conjugated diene monomer unit is 50% by mass or more.

4. The hydrogenated block copolymer according to claim 1, having at least one peak of tan δ in the viscoelasticity measurement chart at less than −25° C.

5. The hydrogenated block copolymer according to claim 1, comprising the hydrogenated copolymer block (b) at at least one end.

6. The hydrogenated block copolymer according to claim 1, wherein a content of the hydrogenated copolymer block (b) is 0.5 to 35% by mass.

7. The hydrogenated block copolymer according to claim 1, wherein a content of all vinyl aromatic compound monomer units is 10 to 80% by mass.

8. The hydrogenated block copolymer according to claim 1, further comprising at least one polymer block (a) principally comprising a vinyl aromatic compound monomer unit.

9. The hydrogenated block copolymer according to claim 8, wherein a content of the polymer block (a) is 3 to 30% by mass.

10. The hydrogenated block copolymer according to claim 1, having a weight average molecular weight of 50,000 to 600,000.

11. A hydrogenated block copolymer composition, comprising:
   the hydrogenated block copolymer (I) according to claim 1; and
   at least one olefin-based resin (II).

12. A hydrogenated block copolymer composition, comprising:
- 0.1 to 95% by mass of the hydrogenated block copolymer (I) according to claim 1;
- 0.1 to 95% by mass of at least one olefin-based resin (II); and
- 0.1 to 99.8% by mass of a hydrogenated block copolymer (III) that is a hydrogenated product of a copolymer comprising a vinyl aromatic compound monomer unit and a conjugated diene monomer unit, and that satisfies the following conditions (4) to (10):
- (4) the hydrogenated block copolymer comprises a polymer block (A) principally comprising a vinyl aromatic compound monomer unit and/or a polymer block (C) principally comprising a conjugated diene monomer unit;
- (5) the hydrogenated block copolymer comprises a random copolymer block (B) containing a conjugated diene monomer unit and a vinyl aromatic compound monomer unit;
- (6) the hydrogenated block copolymer has a content of all vinyl aromatic compound monomer units of 5% by mass or more and 95% by mass or less;
- (7) the hydrogenated block copolymer has a weight average molecular weight of 30,000 to 1,000,000;
- (8) 75% or more of double bonds in conjugated diene monomer units are hydrogenated;
- (9) the hydrogenated block copolymer has at least one peak of tan δ in a viscoelasticity measurement chart at −25° C. or more and 80° C. or less; and
- (10) the hydrogenated block copolymer has a content of the random copolymer block (B) of over 35% by mass.

13. The hydrogenated block copolymer composition according to claim 11, wherein the olefin-based resin (II) comprises at least one polypropylene-based resin.

14. A molded article of the hydrogenated block copolymer composition according to claim 11.

15. The hydrogenated block copolymer according to claim 2, wherein a vinyl bond content in the conjugated diene monomer unit is 50% by mass or more.

* * * * *